US012188715B2

United States Patent
Kong et al.

(10) Patent No.: US 12,188,715 B2
(45) Date of Patent: Jan. 7, 2025

(54) REFRIGERATOR AND METHOD FOR EDITING FOOD INFORMATION

(71) Applicant: HISENSE VISUAL TECHNOLOGY CO., LTD., Shandong (CN)

(72) Inventors: Xiangjian Kong, Shandong (CN); Kejing Lu, Shandong (CN); Yang Liu, Shandong (CN); Congcong Mu, Shandong (CN)

(73) Assignee: HISENSE VISUAL TECHNOLOGY CO., LTD., Shandong (CN)

( * ) Notice: Subject to any disclaimer, the term of this patent is extended or adjusted under 35 U.S.C. 154(b) by 112 days.

(21) Appl. No.: 18/185,459

(22) Filed: Mar. 17, 2023

(65) Prior Publication Data

US 2023/0221066 A1    Jul. 13, 2023

Related U.S. Application Data

(63) Continuation of application No. PCT/CN2021/114091, filed on Aug. 23, 2021.

(30) Foreign Application Priority Data

| Nov. 4, 2020 | (CN) | ......................... 202011218085.2 |
| Apr. 19, 2021 | (CN) | ......................... 202110418594.8 |
| Apr. 19, 2021 | (CN) | ......................... 202110433466.0 |

(51) Int. Cl.
    *F25D 29/00* (2006.01)

(52) U.S. Cl.
    CPC ...... *F25D 29/005* (2013.01); *F25D 2400/361* (2013.01); *F25D 2500/06* (2013.01)

(58) Field of Classification Search
    CPC ............. F25D 29/005; F25D 2400/361; F25D 2500/06
    See application file for complete search history.

(56) References Cited

U.S. PATENT DOCUMENTS

| 9,965,798 | B1 | 5/2018 | Vaananen | |
| 2018/0187954 | A1* | 7/2018 | Yang | ..................... G06F 3/0488 |
| 2019/0348044 | A1* | 11/2019 | Chun | ................. G06Q 30/0601 |

FOREIGN PATENT DOCUMENTS

| CN | 102012146 A | 4/2011 |
| CN | 102635999 A | 8/2012 |
| CN | 202562207 U | 11/2012 |
| CN | 104636856 A | 5/2015 |
| CN | 105423698 A | 3/2016 |
| CN | 106504047 A | 3/2017 |
| CN | 206193856 U | 5/2017 |
| CN | 107477971 A | 12/2017 |

(Continued)

OTHER PUBLICATIONS

Chinese Office Action, mailed Nov. 9, 2021, from Chinese App. No. 202011218085.2.

(Continued)

*Primary Examiner* — Jonathan Bradford
(74) *Attorney, Agent, or Firm* — Workman Nydegger

(57) ABSTRACT

Disclosed are a refrigerator, and a method for processing food information in a refrigerator. While a food editing interface is displayed, a voice recognition interface is displayed for rapidly entering into a voice detection state and then carrying out timely detection of voice input from a user.

20 Claims, 16 Drawing Sheets

(56) References Cited

FOREIGN PATENT DOCUMENTS

| | | | |
|---|---|---|---|
| CN | 108538289 A | 9/2018 | |
| CN | 110245724 A | 9/2019 | |
| CN | 110245725 A | 9/2019 | |
| CN | 111292828 A | 6/2020 | |
| CN | 111336747 A | 6/2020 | |
| CN | 111442604 A | 7/2020 | |
| CN | 111860718 A | 7/2020 | |
| CN | 112344619 A | 2/2021 | |

OTHER PUBLICATIONS

Chinese Office Action, mailed Apr. 20, 2022, from Chinese App. No. 202011218085.2.
Chinese Office Action, mailed Nov. 3, 2022, from Chinese App. No. 202011218085.2.
Chinese Office Action, mailed Jul. 27, 2022, from Chinese App. No. 202110433466.0.
International Search Report, mailed Nov. 24, 2021, from PCT/CN2021/114091.

* cited by examiner

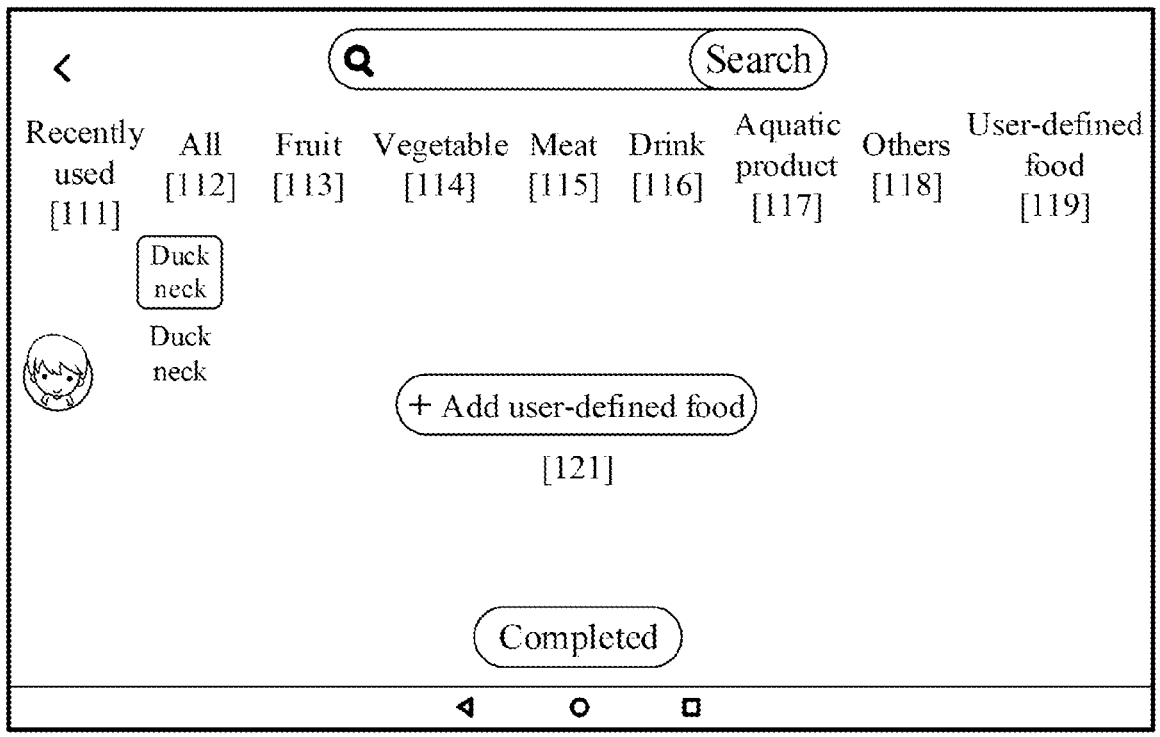

Fig. 10

Upon detecting an RFID tag in a tag reading area, display a user interface including a food editing interface and a voice recognition interface and recognizing voice data input from a user, where the food editing interface is configured for displaying food information input from the user, and the voice recognition interface includes a prompt for indicating the user to input food related information and a content recognized from user's voice data — S010

Present food information on the food editing interface according to recognized content of the voice data input from the user — S011

Fig. 11

REFRIGERATOR AND METHOD FOR EDITING FOOD INFORMATION

CROSS REFERENCE TO RELATED APPLICATIONS

This application is a continuation application of PCT/CN2021/114091 filed on Aug. 23, 2021, which claims the priorities to Chinese Patent Application No. 202011218085.2, filed on Nov. 4, 2020, Chinese Patent Application No. 202110418594.8, filed on Apr. 19, 2021, and Chinese Patent Application No. 202110433466.0, filed on Apr. 19, 2021, which are incorporated in their entireties herein by reference.

FIELD

The present application relates to the field of display technology, and particularly relates to a refrigerator and a method for editing food information.

BACKGROUND

At present, it's common practice for family members to open a refrigerator door and directly obtain information about foods in a refrigerator with naked eyes.

In order to improve user experience, the refrigerator may be equipped with a radio frequency identification (RFID) device or a camera, such that a user can obtain the information from a display on the refrigerator without opening the refrigerator door. The display can be touch-sensitive or support voice control.

Some refrigerators support inputting food information via voice control. If a user utters food information in a nonstandard manner when inputting the information through voice control, accuracy of food information reception by a refrigerator will be affected. In view of this, when food expressions of the users are nonstandard, there is a need to process voice data of the user more accurately.

SUMMARY

The present application provides a refrigerator, comprising: a refrigerator body, including a storage compartment; a door disposed at an opening of the storage compartment; a display arranged on the door; a voice collector, configured for receiving a voice command input from a user, wherein the voice command is associated with operations about food in the storage compartment; and a processor, in connection with the display and the voice collector, wherein the processor is configured for causing the refrigerator to perform: presenting a first food editing interface on the display, wherein the first food editing interface comprises an input item available for receiving an input from the user, and the input item is for indicating a food quantity and a food shelf life, and the input item comprises a value and a measuring unit; during presentation of the first food editing interface, receiving a first voice command input from the user via the voice collector; obtaining a first operation type and first operation data for operating a food quantity by parsing the first voice command, wherein the first operation data comprises a first operation value and a first measuring unit; in response to the first operation data being inconsistent with a pre-stored value and/or a pre-stored measuring unit, determining whether the first measuring unit is a preset measuring unit and whether the first operation value falls within a preset operation range for the first measuring unit; in response to the first measuring unit being the preset measuring unit and the first operation value falling within the preset operation range, determining whether the first measuring unit matches the pre-stored measuring unit in category; in response to the first measuring unit matching the pre-stored measuring unit in category and the first operation type being an operation for inputting a food quantity, determining the first operation value as a target display value; in response to the first measuring unit matching the pre-stored measuring unit in category and the first operation type being an operation for modifying a pre-stored food quantity, determining a target display value according to the first operation value and the pre-stored food quantity; and according to the determined target display value and the first measuring unit, updating the first food editing interface to obtain a second food editing interface.

The present application provides a method for processing food information in a refrigerator, comprising: presenting a first food editing interface on a display of the refrigerator, wherein the first food editing interface comprises an input item available for receiving an input from the user, and the input item is for indicating a food quantity and a food shelf life, and the input item comprises a value and a measuring unit; during presentation of the first food editing interface, receiving a first voice command input from the user via a voice collector of the refrigerator; obtaining a first operation type and first operation data for operating a food quantity by parsing the first voice command, wherein the first operation data comprises a first operation value and a first measuring unit; in response to the first operation data being inconsistent with a pre-stored value and/or a pre-stored measuring unit, determining whether the first measuring unit is a preset measuring unit and whether the first operation value falls within a preset operation range for the first measuring unit; in response to the first measuring unit being the preset measuring unit and the first operation value falling within the preset operation range, determining whether the first measuring unit matches the pre-stored measuring unit in category; in response to the first measuring unit matching the pre-stored measuring unit in category and the first operation type being an operation for inputting a food quantity, determining the first operation value as a target display value; in response to the first measuring unit matching the pre-stored measuring unit in category and the first operation type being an operation for modifying a pre-stored food quantity, determining a target display value according to the first operation value and the pre-stored food quantity; and according to the determined target display value and the first measuring unit, updating the first food editing interface to obtain a second food editing interface.

BRIEF DESCRIPTION OF THE DRAWINGS

FIG. 10 shows another user interface according to an embodiment of the present application.

FIG. 11 shows a flowchart of a method for editing food information according to an embodiment of the present application.

DETAILED DESCRIPTION OF THE EMBODIMENTS

In order to enable those skilled in the art to better understand the present application, the embodiments of the present application will be described below clearly and comprehensively in conjunction with accompanying drawings of the embodiments of the present application. Apparently, the embodiments described are merely some rather than all of the embodiments of the present application.

At present, it's common practice for family members to open a refrigerator door and directly obtain information about foods in a refrigerator with naked eyes.

In order to improve user experience, the refrigerator can be equipped with a radio frequency identification (RFID) device or a camera, such that a user can obtain the information from a display on the refrigerator without opening the refrigerator door. The display can be touch-sensitive or support voice control.

In the description of food edition in the present application, food edition can be executed on a refrigerator having a display or on other household appliances and handheld devices.

Figure 1A:
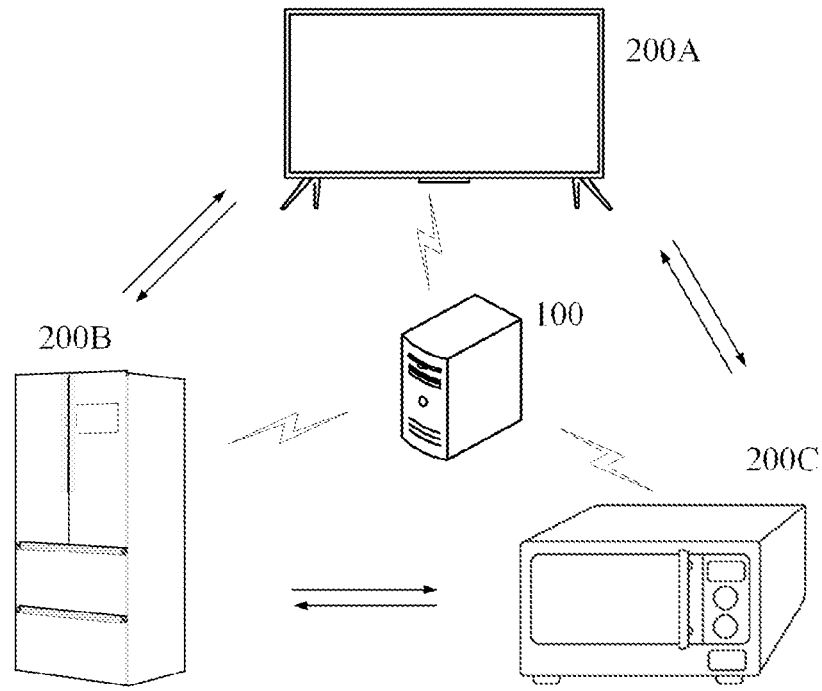
FIG. 1A shows an interaction scenario of a display apparatus according to an embodiment of the present application.

FIG. 1A shows a schematic diagram of an operation scenario of a display apparatus according an embodiment.

In some embodiments, the display apparatus may be any home or office device having a display screen. For example, when a mobile terminal, a tablet computer, a computer, a notebook computer, a television, a refrigerator, an electronic whiteboard, an oven, a washing machine, a videophone, a mirror, etc. may be used as a device for a user to display a user interface (UI), the above devices are all display apparatuses related to the present application, and are not limited to a television, a refrigerator and an oven shown in FIG. 1A.

In some embodiments, a display apparatus 200 is further in data communication with a server 100. The display apparatus 200 is in communication with the server by means of a local area network (LAN), a wireless local area network (WLAN) or other networks. The server 100 may provide various contents and interactions for the display apparatus 200. The server 100 may be a cluster or a plurality of clusters, and may include one or more types of servers.

In some embodiments, the display apparatus may be further in data synchronization and communication with other display apparatuses. The display apparatus 200 is configured to interact with other apparatuses by means of a local area network (LAN) or a wireless local area network (WLAN). The display apparatus and other apparatuses in the same local area network may be in communication with each other. When one display device updates data, other devices also update data accordingly. Communication may also be implemented through account management. When the display device and other devices log in by means of accounts, the devices that log in the same account may be in data communication.

In some embodiments, the display apparatus may receive an instruction by means of intelligent devices or control devices, such as mobile phones and tablets, and may also be controlled by a user through touch or gestures.

In some embodiments, the display apparatus 200 may also be controlled through a method without a control device 100 and a smart device 300. For example, a module for obtaining a voice command configured inside the display apparatus 200 may directly receive a voice command from a user for control, or a voice control device configured outside the display apparatus 200 may receive a voice command from a user for control.

Figure 1B:
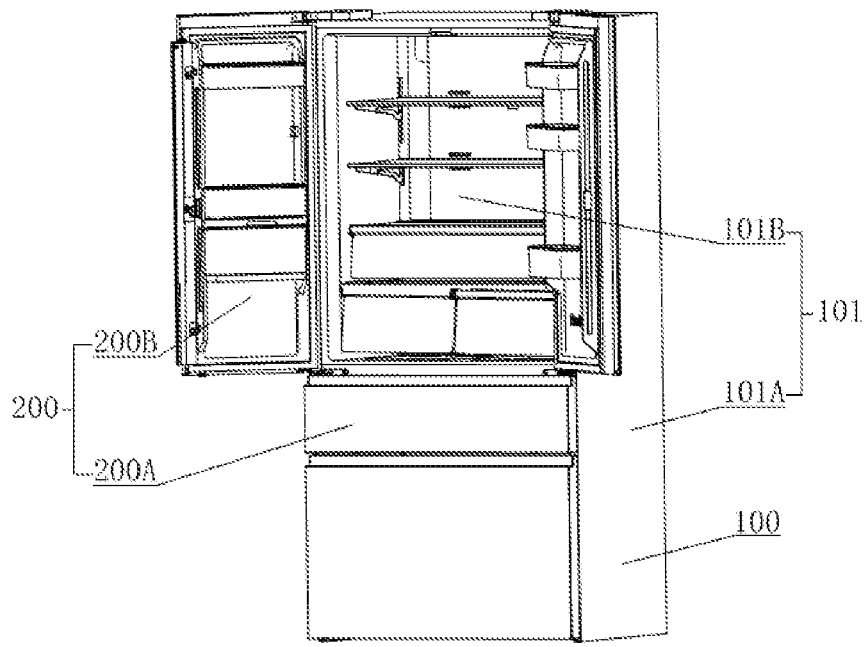
FIG. 1B shows a three-dimensional diagram of a refrigerator according to an embodiment of the present application.

A discussion will be made taking a refrigerator as an example below. FIG. 1B shows a 3-D diagram of a refrigerator according to an embodiment of the present application. The refrigerator in the embodiments of the present disclosure is approximately in the shape of a cuboid. An appearance of the refrigerator is defined by a storage compartment 101 providing a limited storage space and a plurality of doors 200 provided at an opening of the storage compartment 101. The storage compartment 101 is a refrigerator body 100 having an opening. In an example shown in FIG. 1B, the storage compartment 101 includes a freezer compartment 101A at a lower portion and a refrigerator compartment 101B at the upper portion. The freezer compartment 101A and the refrigerator compartment 101B each have one or more independent storage spaces.

In some embodiments, the freezer compartment 101A may be selectively covered by a drawer-type freezer compartment door 200A. The refrigerator compartment 101B is partitioned into a left side and a right side. The refrigerator compartment 101B is selectively opened or closed by a refrigerator compartment door 200B pivotally mounted on the refrigerator compartment 101B.

Figure 1C:
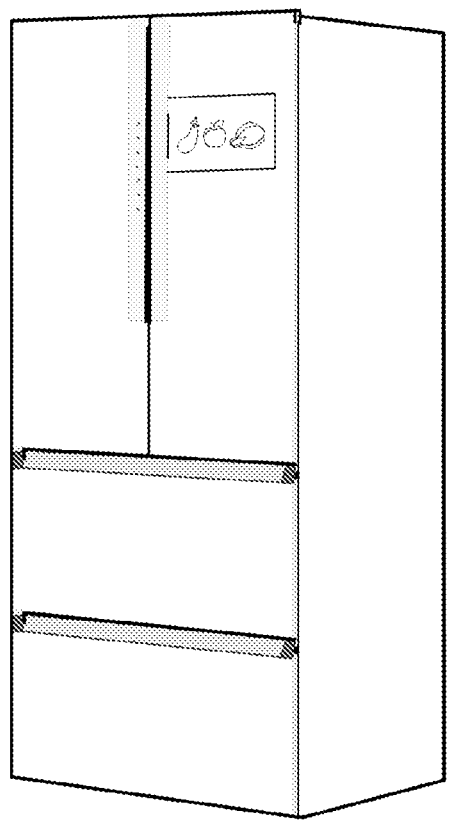
FIG. 1C shows a schematic diagram of an appearance of a refrigerator according to an embodiment of the present application.

FIG. 1C shows a schematic diagram of an appearance of a refrigerator according to an embodiment of the present application. As shown in FIG. 1B, a display screen is provided on the refrigerator compartment door 200B and embedded in a door body. In some embodiments, a plane of a screen of the display screen is flush with an outer surface of the door.

As shown in FIG. 1B and FIG. 1C, a refrigerator body of the refrigerator according to the embodiments of the present application is internally provided with at least two storage compartments, such as the freezer compartment, the refrigerator compartment, a variable-temperature compartment and/or a preservation compartment. Each storage compartment may have a plurality of independent storage spaces, such as a drawer-type compartment.

Figure 2:
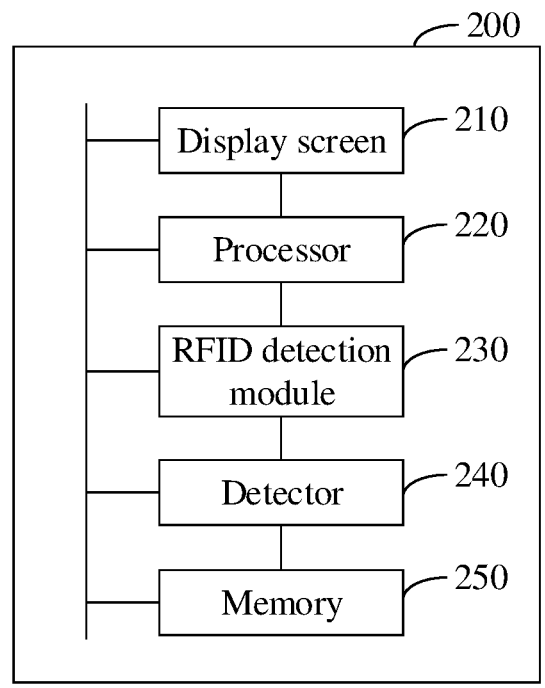
FIG. 2 shows a schematic diagram of a hardware configuration of a refrigerator according to an embodiment of the present application.

FIG. 2 shows a schematic diagram of a hardware configuration of a refrigerator according to an embodiment of the present application. As an example, the refrigerator 200 may include a display screen 210, a processor 220, a memory 250, and several user input interfaces.

In some embodiments, the refrigerator 200 may further include at least one RFID detection module 230 and a detector 240. The display screen 210, the RFID detection module 230, the detector 240 and the memory 250 are connected with the processor 220 by communication interfaces. The display 210 is configured for receiving an image signal output from the processor 220, and displaying a video content, an image, a component on a menu operation interface, and a user operation UI for controlling the refrigerator 200.

The processor 220 may include one or more processing units, such as a system on a chip (SoC), a central processing unit (CPU), a microprocessor (MCU) and a storage processor. Different processing units may be independent devices or integrated in one or more processors.

The memory 250 may include one or more storage units, which, for example, may include volatile memories, such as a dynamic random access memory (DRAM) and a static random access memory (SRAM), or may also include non-volatile memories (NVMs), such as a read-only memory (ROM) and a flash memory. Different storage units may be independent devices, or may also be integrated or packaged in one or more processors or communication interfaces, and become a part of the processors or communication interfaces.

The detector 240 may include a voice collector, such as a microphone, which may be configured for receiving voice from the user. For example, a voice command signal from the user to control the refrigerator 200 is included.

The user input interfaces include at least one of a microphone, a touch pad, a sensor, a key or other input interfaces. For example, the user may realize command input through such as voice, touch, gestures and press. The input interfaces convert analog signals received to digital signals, and the digital signals into corresponding instruction signals, and send the signals to the refrigerator 200.

In some embodiments, the processor 220 may include a voice recognition module, and the voice recognition module further includes a voice parsing unit and a voice command database, such that the refrigerator may independently conduct voice recognition on voice data input from the user and match recognized voice content with a voice command in the voice command database.

In some embodiments, the RFID detection module 230 may be arranged in one or more storage compartment, and is configured for obtaining food information via an RFID tag by transmitting a wireless signal in the corresponding storage compartment and receiving a signal of the RFID tag in the storage compartments.

In some embodiments, the refrigerator further includes a tag reading area arranged outside the storage compartment, which is a sensing area for identifying RFID tags, and the RFID detection module is arranged at the tag reading area and is configured for detecting the RFID tags placed in the area. Optionally, the tag reading area may be configured at a bottom of the display screen, such that the user may place (or take away) an RFID tag in the tag reading area and operate the user interface presented on the display screen at the same time.

In some embodiments, the refrigerator may further include an RFID processing module, the RFID processing module is connected with each RFID detection module, and is configured for controlling the RFID detection module to transmit a wireless signal and receive a signal of an RFID tag returned from the RFID detection module.

In some embodiments, the RFID detection module may be implemented as an antenna. Antennas disposed in different storage compartments may have different power, as long as the power of the antenna in each storage compartment may ensure that the antenna may identify a food in the corresponding compartment, so as to avoid increasing a false identification rate in the case of too large power and failure to completely identify foods in the corresponding compartment in the case of too small power. In specific implementations, the power of each antenna may be determined in advance according to a size of a space of a storage compartment, and the power of each antenna may be set in the refrigerator. The larger the space is, the higher the power is.

To realize intelligent management of foods, an RFID tag is configured for identifying a food in the storage compartment.

In some embodiments, a correspondence between the RFID tag and the food information is established to achieve virtual association between the RFID tag and the food information. identifier information of the RFID tag may be a tag code of the RFID tag identified by the RFID detection module 230, or a code segment in the tag code. In the embodiments, the processor 220 may determine the food information corresponding to each RFID tag according to the identifier information of each RFID tag and the pre-established correspondence.

For example, the pre-established correspondence between the identifier information of the RFID tag and the food information may be shown in the following table I.

TABLE I

| RFID | food information |
|---|---|
| identifier 1 | Apple |
| identifier 2 | Cucumber |
| identifier 3 | Pork |
| . . . | . . . |

After the correspondence between the RFID tag and the food information is established, the processor 220 obtains the tag code of the RFID tag by detecting the signal of the RFID tag, and food information associated with each tag may be determined according to the tag code.

In some embodiments, the food information associated with each tag is related with a storage compartment, and a storage position of the food may be determined according to the storage compartment related with the food information.

For example, if the food information "apple" is related with "refrigerator compartment", it may be determined that apples are stored in the refrigerator compartment.

In some embodiments, a food management interface is displayed on the display screen 210, and the user manages foods in the refrigerator by operating the food management interface. For example, according to the food information associated with each RFID tag in the storage compartment, a food control/icon corresponding to the RFID tag is drawn on the food management interface, such that the foods in the refrigerator are presented in the form of icons, images and texts, etc. In addition, functional controls such as an RFID tag identification control and a food adding control may also be drawn on the food management interface, and can be operated by the user so as to trigger the processor 210 to realize corresponding functions.

Figure 3:
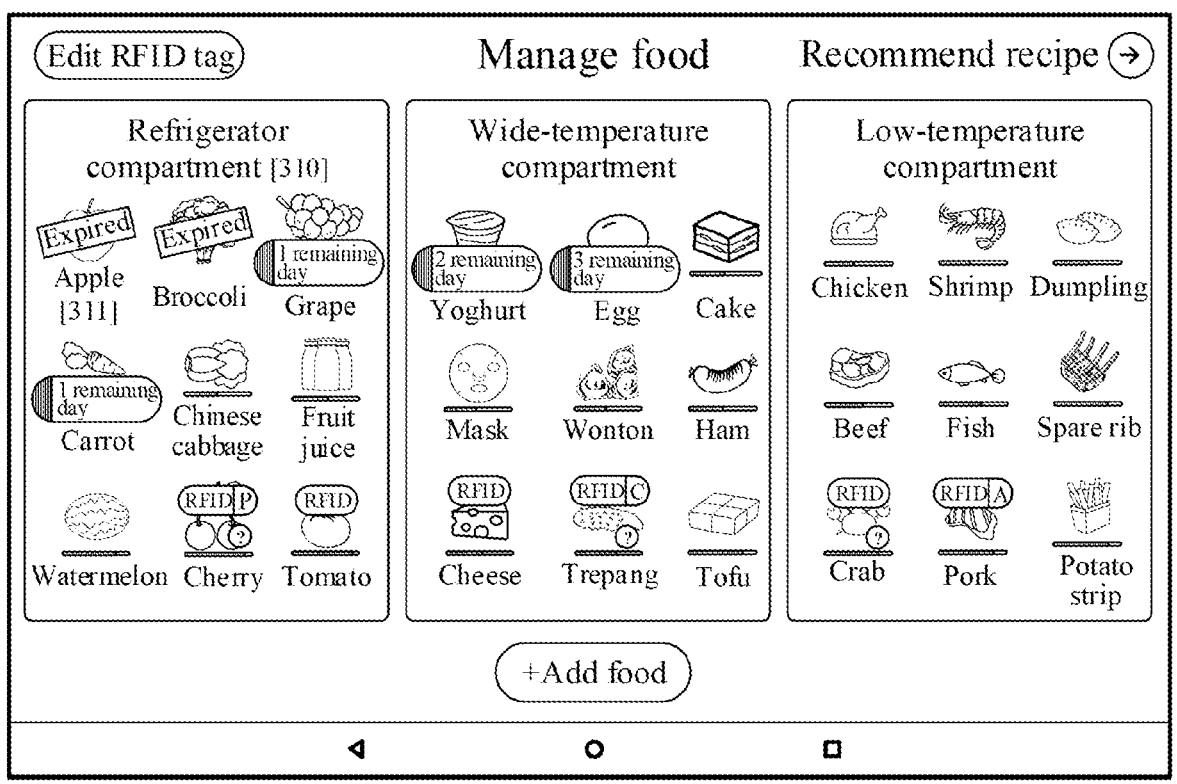
FIG. 3 shows a user interface according to an embodiment of the present application.

FIG. 3 shows a user interface according to an embodiment of the present application, which is an exemplary food management interface. With reference to FIG. 3, the food management interface includes an RFID tag editing control, a recipe recommending control, and a food display area corresponding to a storage compartment, such as a food display area 310 corresponding to the refrigerator compartment. A food icon and a food name, such as a food icon "Apple" 311 in the food display area 310 is presented in the food display area.

In some embodiments, the tag code of the RFID tag includes two code segments, namely a first code segment and a second code segment. The first code segment is configured for writing a first code, the first code may be a predetermined code or a non-predetermined code. For an RFID tag the first code of which is a predetermined code, food information corresponding to the RFID tag may be defined by the user, that is, the tag is a user-defined tag. For an RFID tag the first code of which is a non-predetermined code, preset food information corresponding to the RFID tag is pre-stored in a cloud server or a local food database, and cannot be defined by the user, that is, the tag is a pre-defined tag. The second code segment is configured for writing a second code, and the second code is unique identifier information of the RFID tag. It should be noted that user-defined food names indicates that the user may associate any food name with an RFID tag according to requirements, and meanwhile, the user may also change a defined tag according to changed requirements, such that the same tag may be associated with different food names successively; and a user cannot define food names, meaning that the user cannot change food names associated with RFID tags, and the food names associated with such RFID tags are pre-defined and stored in the cloud server or a local food database and are not available for user's configuration.

When one RFID tag is given, whether the tag is a pre-defined tag or a user-defined tag may be determined according to the first code in the tag code. If the first code is the predetermined code, the tag is a user-defined tag. If the first code is the non-predetermined code, the tag is a pre-defined tag. In some embodiments, the at least two code segments in the tag code of the RFID tag conform to preset composition rules, and after obtaining the tag code, the processor obtains the first code and/or the second code by intercepting the first code segment and/or the second code segment according to the preset composition rules, so as to save a process of parsing long code information, therefore improving processing efficiency.

In some embodiments, the predetermined code is unique, such as 00. More than one non-predetermined code may exist and are not unique, and one non-predetermined code corresponds to one type of food information.

For example, an RFID tag has a tag code structure shown in Table II below.

TABLE II

| Code segment | First code segment | Second code segment |
| --- | --- | --- |
| Content | First code (predetermined code or non-predetermined code) | Second code (identifier information) |
| Length | 2-bit hexadecimal | 24-bit hexadecimal |

For example, if the tag code of the RFID tag obtained by the processor is "011234567890123456789012345678901234", the first code may be intercepted as "01" and the second code may be intercepted as "1234567890123456789012345678901234" according to the preset composition rules.

It should be noted that, according to different requirements, the tag code of the RFID tag may further include more code segments, such as a third code segment configured for being written into a manufacturer identifier of the RFID tag, and a fourth code segment used as reserved bits of the tag code, so as to improve expandability of the RFID tag. In some other embodiments, the manufacturer identifier of the RFID tag may also be included in the second code segment, which will not be repeated herein.

For example, a correspondence between the first code (non-predetermined code) and the food information may be shown in the table III below.

TABLE III

| RFID first code | food name |
| --- | --- |
| 01 | Radish |
| 02 | Carrot |
| 03 | Lotus root |
| ... | ... |

In some embodiments, when the food management interface is displayed on the display screen, the user may input an instruction for editing the food information by operating the food management interface. For example, the user clicks a food information editing control on the food management interface to edit the food information. After receiving the instruction, the processor obtains the identifier information of the RFID tag by starting to detect the signal of the RFID tag placed in the tag reading area, and displays an interface for editing the food information associated with the RFID tag, which is the food editing interface, and the food information associated with the RFID tag is input into the food editing interface.

In some embodiments, obtained identifier information of the RFID tag may also be presented on the food editing interface, such that the user may visually see the identifier information of the RFID tag, and user experience is improved without manually inputting the identifier information.

In some embodiments, at least one food editing item is presented on the food editing interface, and each food editing item includes an item name and an item content. The item content is a part available for edition, and the user may input the food information associated with the RFID tag by inputting the item content of each food editing item at an input position. After input is completed, the processor stores input food information and identifier information correspondingly, such that a correspondence table between identifier information of RFID tags and food information is established.

In some embodiments, the interface for editing the food information may be referred to as the food editing interface, and food editing items presented on the interface may include a food name editing item, a food shelf life editing item, a food quantity editing item, etc. It should be understood that the food name editing item may have a "tag name" as an item name and a food name to be input or updated as an item content, the food shelf life editing item may have a "shelf life" as an item name and a shelf life which is configured to be input or updated as an item content, and the food quantity editing item may have a "quantity" as an item name and a quantity to be selected or changed as an item content.

As shown in FIG. 3, the user may input an instruction for indicating food information edition by clicking the RFID tag editing control in the interface. In response to the instruction, the processor obtains the identifier information of the RFID tag by controlling the RFID detection module to start to detect the signal of the RFID tag in the tag reading area. After obtaining the identifier information of the RFID tag, the processor presents the food editing interface on the display screen.

In some embodiments, after the processor receives the instruction for indicating food information edition input from the user, in response to the instruction, a tag scanning interface is displayed, a scanning prompt is presented on the tag scanning interface, and the scanning prompt is displayed to prompt the user to place the RFID tag for scanning in the tag reading area. Meanwhile, the processor obtains the identifier information of the RFID tag by controlling the RFID detection module to start to detect the signal of the RFID tag in the tag reading area. After obtaining the identifier information of the RFID tag, the processor presents the food editing interface on the display screen.

In some embodiments, the user may also issue an instruction for indicating food information edition by saying a voice command. For example, the user says "edit a tag". When the voice data input from the user is received and a content of the voice data is recognized as "edit a tag", it is determined that an input voice command for triggering edition of the food information corresponding to the RFID tag is received. In this case, the processor displays the tag scanning interface in response to this voice instruction, and starts to detect the RFID tag in the tag reading area.

In some embodiments, when the input voice command is received, whether the RFID tag in the tag reading area is detected is determined firstly. If no RFID tag in the tag reading area is detected, the user may still hasn't place the RFID tag to be edited in the tag reading area. In this case, the tag scanning interface including a scanning prompt is displayed to prompt the user to place the RFID tag to be edited in the tag reading area.

In some embodiments, the above instruction for indicating food information edition is also referred to as an RFID tag editing instruction.

Figure 4:
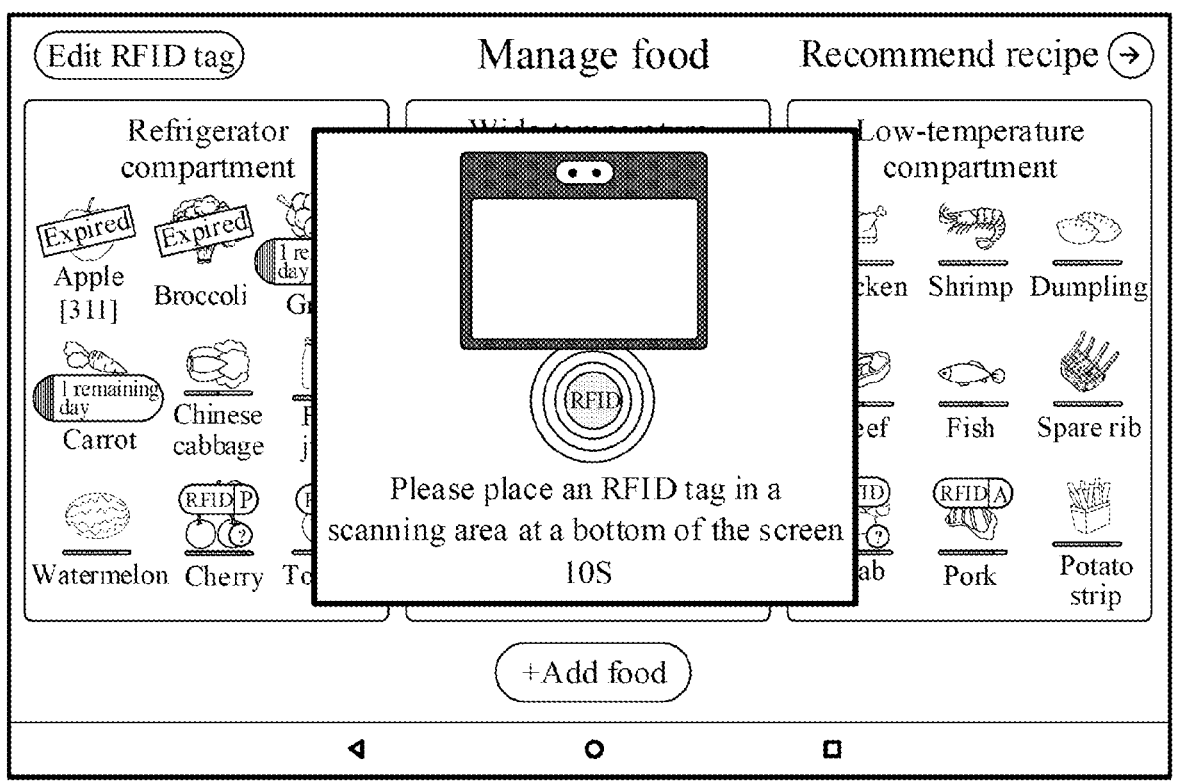
FIG. 4 shows another user interface according to an embodiment of the present application.

FIG. 4 shows a user interface according to some embodiments of the present application, which is an exemplary tag scanning interface. As shown in FIG. 4, a scanning prompt is presented on the tag scanning interface, and has a specific content that "please place an RFID tag in a scanning area at a bottom of a screen". When an RFID tag placed in a tag reading area by a user is detected, a food editing interface as shown in FIG. 5 is displayed.

Figure 5:
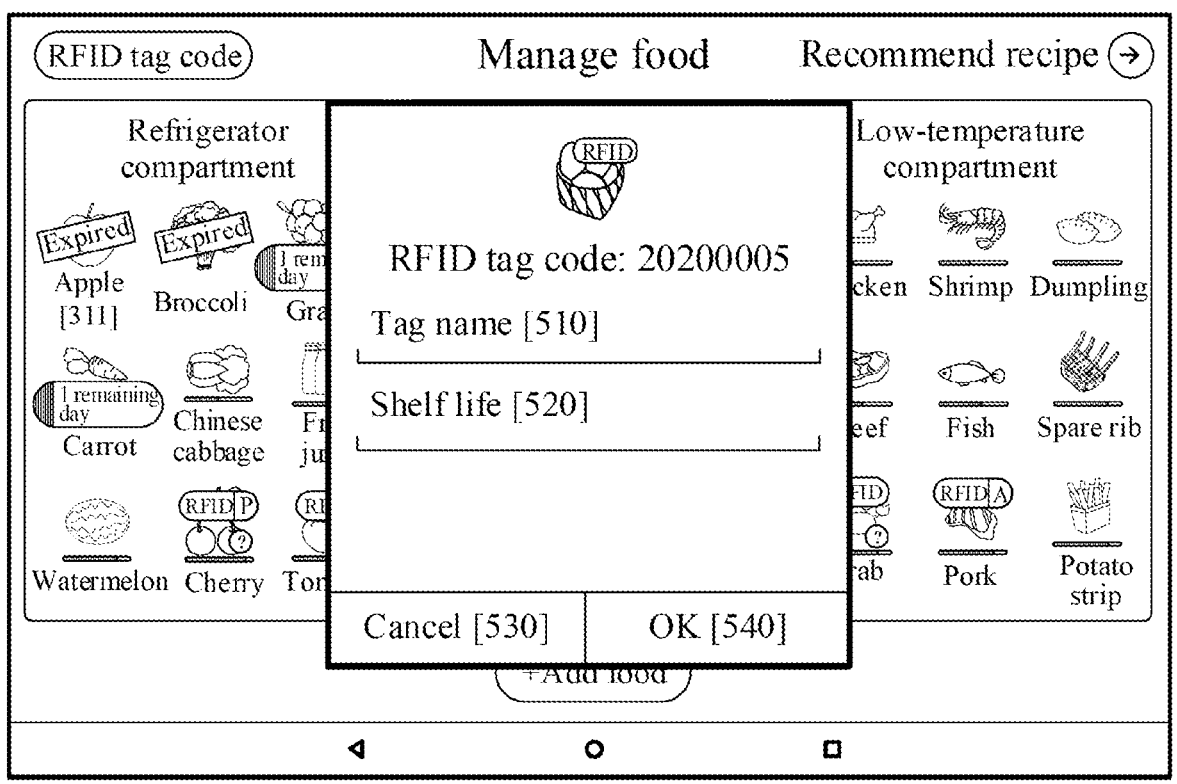
FIG. 5 shows another user interface according to an embodiment of the present application.

With reference to FIG. 5, identifier information "20200005" of the RFID tag is presented on the food editing interface. In this way, the user does not need to manually input the identifier information, such that input errors are avoided, and user operations are reduced. A plurality of food editing items are further presented on the food editing interface, and comprise a food name editing item 510 and a food shelf life editing item 520. Each food editing item has an input area for inputting an item content. In addition, a "Cancel" control 530 and an "OK" control 540 are displayed.

In this way, virtual association between an RFID tag and food information is realized by making the RFID tag correspond to the food information input from the user, the food information may be searched according to the identifier information of the RFID tag, and a correspondence between the RFID tag and the food information may be modified, such that the same RFID tag may correspond to different food information successively, and use flexibility of the RFID tag is improved.

In some embodiments, the user may edit the food information corresponding to the RFID tag by means of a voice command. For example, the user may say, "define a tag for 2 kilograms of beef", a processor may automatically update an item content of a corresponding food editing item according to recognized voice texts such as "beef" and "2 kilograms", and the user does not need to input texts manually. In this way, user operations may be further reduced, such that an editing process may be faster; and universality of the function may be improved, such that elders or children who are incapable of typing may complete edition of food information.

In some embodiments, when the processor detects the RFID tag placed in the tag reading area by the user, a voice recognition interface is displayed while the above food editing interface is displayed, and reception and recognition for voice input from the user are started. The voice recognition interface may display an input prompt and recognized voice text. According to the identified voice text, the item content of the food editing item in the interface is updated.

Figure 6:
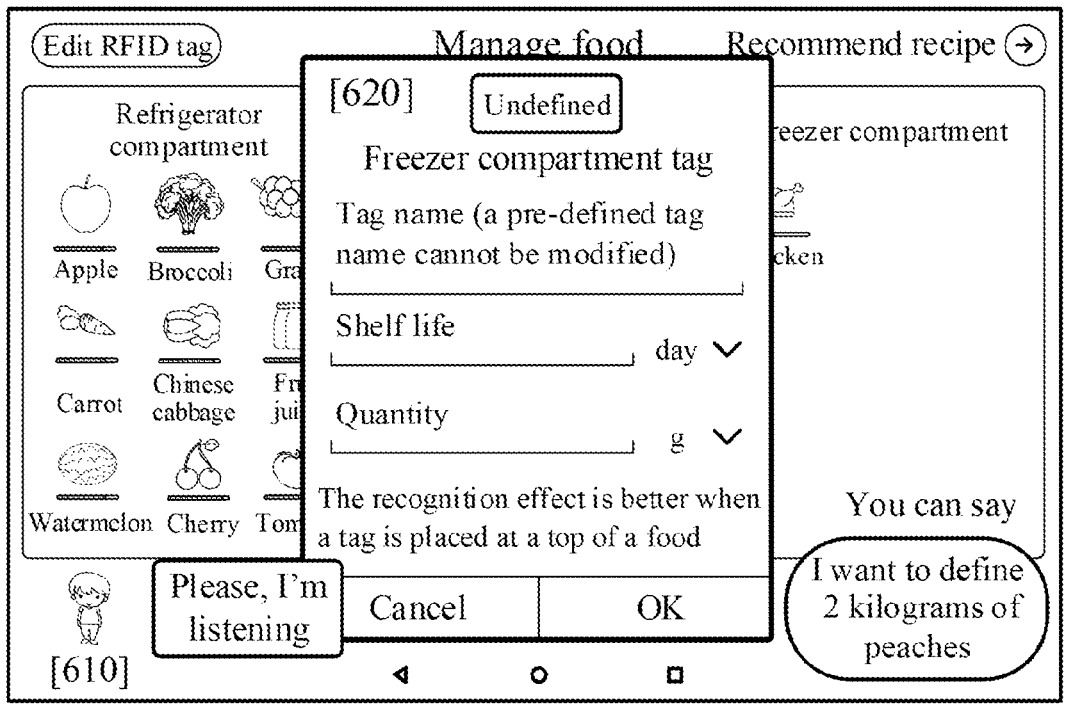
FIG. 6 shows another user interface according to an embodiment of the present application.

FIG. 6 shows a user interface according to some embodiments of the present application, which is a user interface presenting a food editing interface and a voice recognition interface at the same time. As shown in FIG. 6, a view display area 610 where the voice recognition interface is located is presented at an upper layer above a view display area 620 where the food editing interface is located. The voice recognition interface displays an input prompt with content like "you can say, I want to define 2 kilograms of peaches". When voice data input from a user is received and the voice data is recognized, the voice recognition interface may also present the recognized voice text based on recognition result of the voice data.

In some embodiments, a processor receives voice data input from the user and transmits the voice data to a server; and the server obtains voice content by recognizing the voice data and generates a voice instruction according to the voice content. The voice instruction includes a plurality of fields, a field corresponds to a food editing item, a field name is a name of an item, and a field value is content of an item. The server returns the generated voice instruction to a refrigerator, and the refrigerator updates a content of a food editing item according to a field value of each field in the voice instruction.

An exemplary voice instruction format is as follows.

| Field name | Field value |
|---|---|
| cmd | RFID-write |
| name | Beef |
| count | 1000 g |

It may be seen that the voice instruction instructs the refrigerator to execute an RFID tag editing operation, where a field value "beef" corresponding to a field name "name" is used to update an item content of a food name editing item, and a field value "1000 g" corresponding to a field name "count" is used to update a food quantity editing item.

In some embodiments, after the processor detects an RFID tag placed in a tag reading area by the user, whether the RFID tag is a user-defined tag is determined. If the RFID tag is the user-defined tag, a first editing interface is displayed, and the first editing interface includes a plurality of food editing items. Preset default character(s) is presented on an item content display area (that is, an input area) corresponding to each food editing item, and an item content of each food editing item is editable. In this way, the user may update the item content of each food editing item by inputting texts or voice control. If the RFID tag is not the user-defined tag, preset food information corresponding to the tag is obtained according to a first code in a tag code, and a second editing interface is displayed according to the obtained preset food information. The second editing interface is different from the first editing interface in that, in the second editing interface, preset food information, such as a preset food name, is presented on the item content display area corresponding to each food editing item, and an item content of the food name item cannot be edited, that is, the user cannot change a currently displayed food name by inputting texts or voice control.

In specific implementations, the processor may obtain corresponding preset food information from a cloud server according to the first code. Alternatively, the processor may obtain preset food information from a local preset food database according to the first code. The local preset food database may be pre-downloaded by the processor from the cloud server.

In some embodiments, if the RFID tag placed in the tag reading area by the user is the user-defined tag, whether food information corresponding to a second code exists in local data is determined according to the second code (that is, identifier information of the RFID tag) in the tag code. If there is the food information corresponding to the second code in the local data, the food information is displayed as the item content of the food editing item in the first editing interface. In this way, on the one hand, food information currently associated with the RFID tag may be displayed to the user. On the other hand, if the user wants to modify the currently associated food information, new food information may be input through a text input operation or voice input operation. In addition, if the user merely wants to modify part of the food information, it is necessary to re-input the part of the food information but not to modify the other part of the food information. If there is no food information associated with the RFID tag in the local data, the preset default character is used as the item content of the food editing item and presented on the first editing interface.

Figure 7:
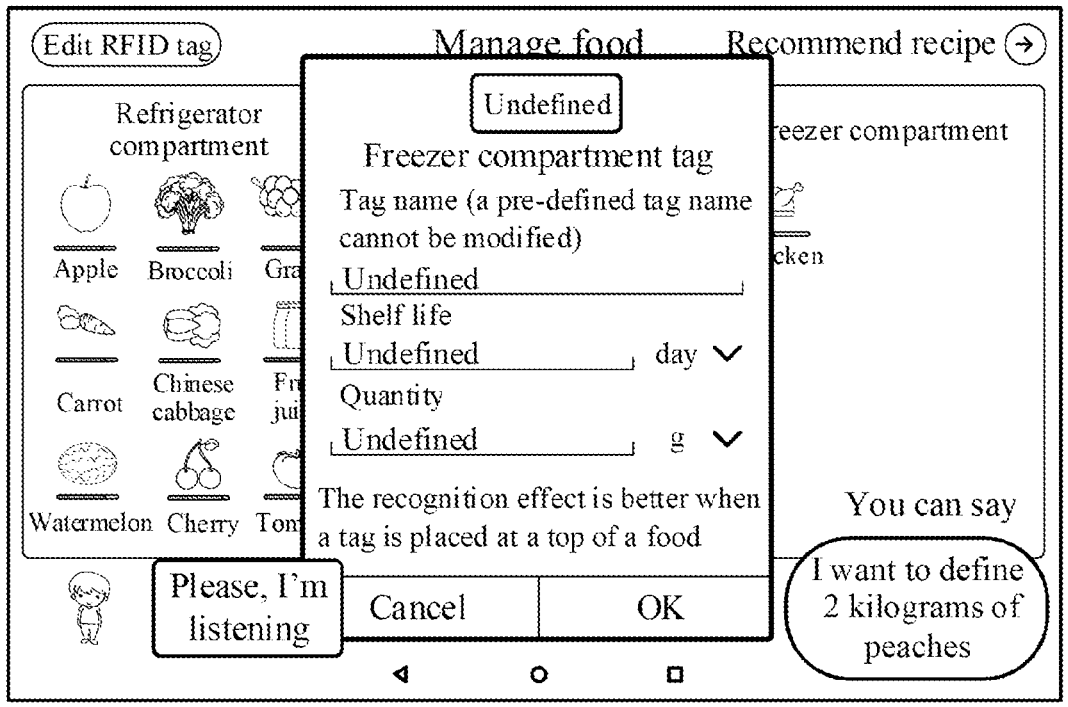
FIG. 7 shows another user interface according to an embodiment of the present application.

FIG. 7 shows a user interface according to some embodiments of the present application, which is an exemplary first editing interface. As shown in FIG. 7, an item content of a food editing item is a default character "undefined" in the interface.

Figure 8:
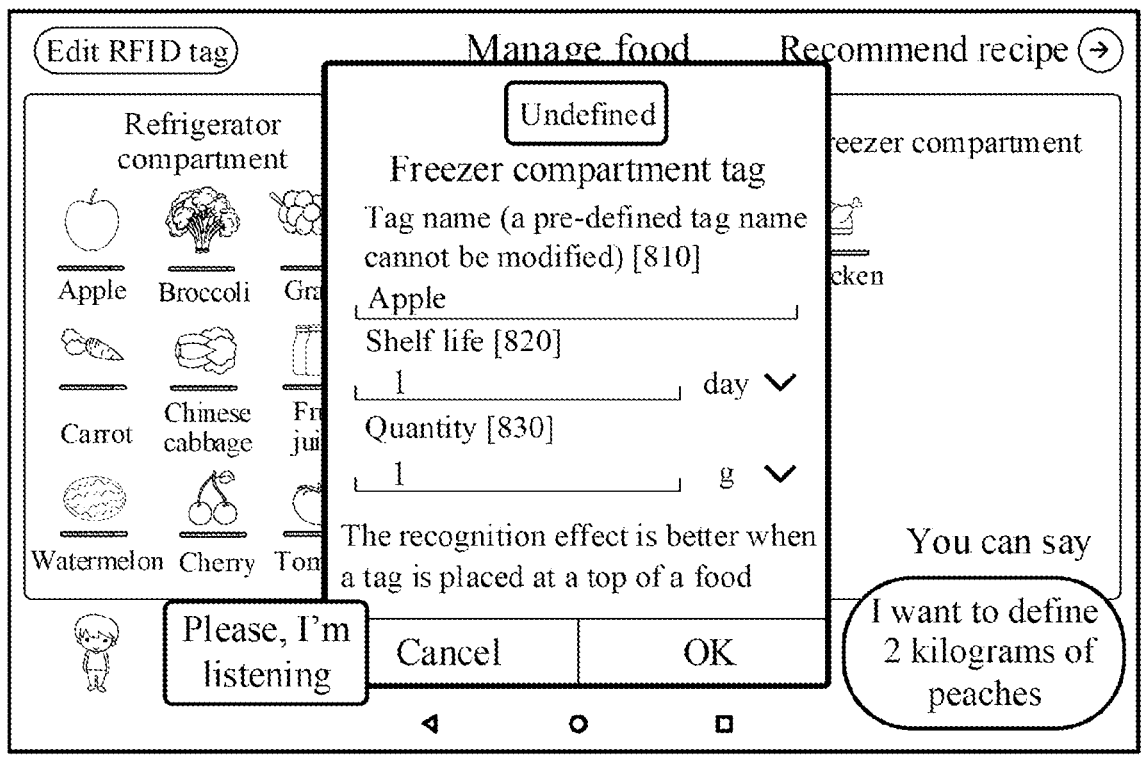
FIG. 8 shows another user interface according to an embodiment of the present application.

FIG. 8 shows a user interface according to some embodiments of the present application, which is an exemplary second editing interface. As shown in FIG. 8, in the interface, an item content of a food name editing item 810 is a default character "apple", an item content of a shelf life editing item 820 is a default character "1", and an item content of a food quantity editing item 830 is a default character "1". "Apple", "1", etc. are preset food information corresponding to a currently detected tag.

As mentioned above, for a pre-defined tag, an associated food name is non-editable; and for a user-defined tag, an associated food name is editable. Based on this, when a processor of a refrigerator updates an food editing item according to a voice command returned from a server, if an RFID tag is a user-defined tag, contents of all food editing items are updated, and if the RFID tag is not a user-defined tag, contents of the food editing items except the food name editing item are updated.

It should be understood that a process of displaying or updating an item content of each food editing item according to a recognized text content in a voice command may refer to the embodiments shown in FIG. 1A-FIG. 8. For example, when the RFID tag is the user-defined tag, all the food editing items are updated, and when the RFID tag is not the user-defined tag, the food editing items except the food name editing item are updated, and so on, which will not be repeated herein.

It may be seen that based on the refrigerator according to the embodiments of the present application, the user may edit food information corresponding to the RFID tag through voice input. Specifically, when an RFID tag placed in a tag reading area by the user is detected, a voice recognition interface is displayed while a food editing interface is displayed, that is, a voice assistant application is automatically switched to run in the foreground of the display apparatus to enter a voice detection state rapidly and detect voice input from the user in time while the food editing interface is presenting on the display. As such, the user may enable the refrigerator to automatically complete food information input process by saying food information that he/she wants to edit, such that user operations are reduced, an editing process is faster, and user experience is improved.

Figure 9:
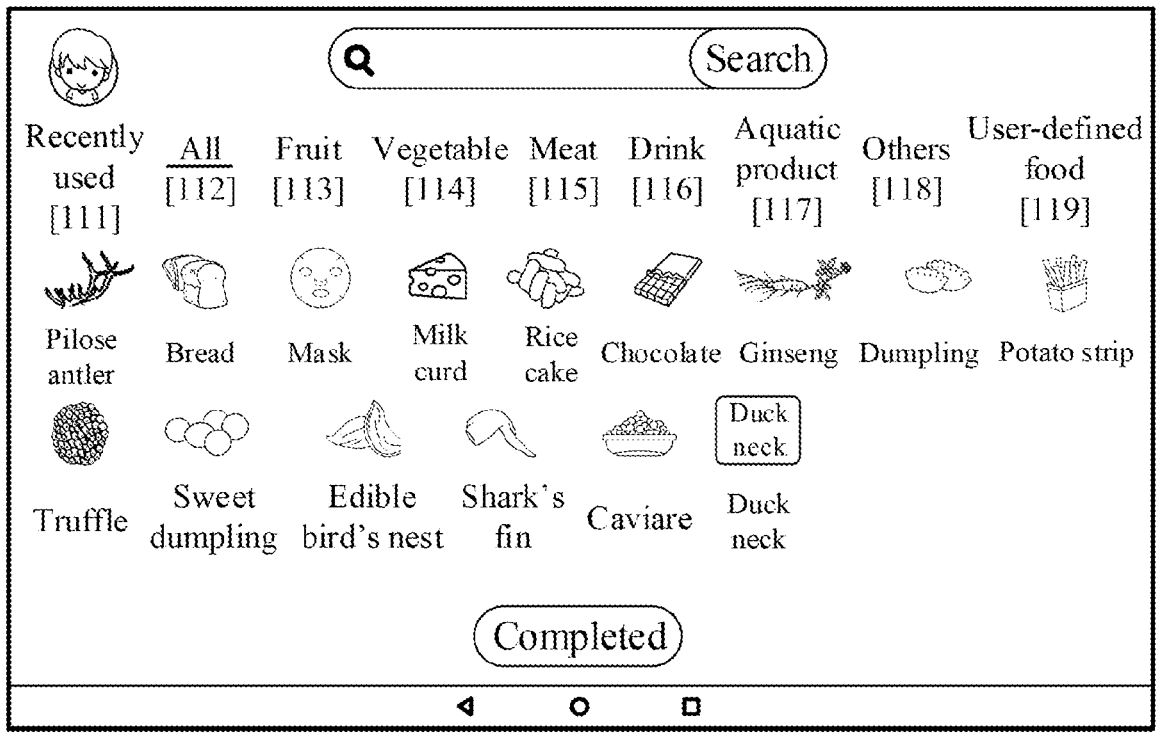
FIG. 9 shows another user interface according to an embodiment of the present application.

FIG. 9 shows a user interface according to an embodiment of the present application, which is an exemplary food database interface. As shown in FIG. 9, the interface includes operation controls 111-119 named "Recently used", "All", "Fruit", "Vegetable", "Meat", "Drink", "Aquatic product", "Others" and "User-defined". In FIG. 9, when the "All" control 112 is selected, a food icon corresponding to each piece of food information in a complete food collection is presented on the interface. When the interface shown in FIG. 9 is displayed, if a user clicks the "User-defined" control 119, the user interface changes from FIG. 9 to FIG. 10. In the interface shown in FIG. 10, a food icon corresponding to each piece of food information in a user-defined food collection is displayed.

As shown in FIG. 10, an operation control 121 for adding user-defined food information is also presented on a food database interface for displaying a user-defined food collection. A user may input an instruction for adding a user-defined food by operating the operation control 121. In response to the instruction, a processor displays a food definition interface. The user may input newly defined food information in the food definition interface.

In some embodiments, in the user interfaces shown in FIG. 9 and FIG. 10, the user may select one or more food icons through predetermined operations, for example, by long pressing the icons. Selection of the icons may also be canceled through predetermined operations, for example, by long pressing the selected icons.

Some embodiments of the present application further provides a method for editing food information. The method is applied to refrigerators as shown in FIG. 1A-FIG. 10, and the method can be performed by, but is not limited to, a processor of a refrigerator. FIG. 11 shows a flowchart of a method for editing food information according to an embodiment of the present application. As shown in FIG. 11, the method may include the following.

S010, upon detecting an RFID tag in a tag reading area, displaying a user interface including a food editing interface and a voice recognition interface and recognizing voice data input from a user, where the food editing interface is configured for displaying food information input from the user, and the voice recognition interface includes a prompt for indicating the user to input food related information and a content recognized from user's voice data.

In some embodiments, when an RFID tag editing instruction is received, for example, a user inputs the RFID tag editing instruction by clicking an RFID tag editing control on an interface as shown in FIG. 3; and in response to the RFID tag editing instruction, the RFID tag in the tag reading area is detected.

In some other embodiments, when a voice command for food tag information edition is received. The preset voice command is configured for triggering edition of food information corresponding to the RFID tag. For example, the user inputs a voice command by saying a voice command like "Edit a tag". In response to the voice command, the RFID tag in the tag reading area is detected.

In some embodiments, upon receiving a voice command for tag information edition. In response to this voice command, a tag scanning interface is displayed, a scanning prompt is presented on the tag scanning interface, and the scanning prompt is configured for prompting the user to place an RFID tag to be edited in the tag reading area. Meanwhile, the RFID tag in the tag reading area is detected.

S011, presenting food information on the food editing interface according to recognized content of the voice data input from the user.

In some embodiments, displaying a food editing interface on the display when an RFID tag placed in a tag reading area by a user is detected includes: obtaining a tag code by detecting the RFID tag, where the tag code includes a code segment for indicating whether the RFID tag is a user-defined tag; whether the RFID tag is a user-defined tag is determined according to the tag code; and in response to the RFID tag being a user-defined tag, a default character is used as an item content of a food editing item and is presented on the food editing interface. For example, on the food editing interface shown in FIG. 7, an item content of a food editing item is a default character "undefined". If the RFID tag is not a user-defined tag, preset food information of the RFID tag is obtained according to the tag code, and the preset food information is displayed as the item content of a food editing item on the food editing interface. For example, as shown in FIG. 8, on the food editing interface, an item content of a food name editing item is a default character "Apple", an item content of a shelf life editing item is a default character "1", and an item content of a food quantity editing item is a default character "1". "Apple", "1", etc. are preset food information corresponding to a currently detected tag.

In some embodiments, updating the item contents of the food editing items according to the recognized content from the voice data from the user includes: receiving voice data input from the user, and transmitting the voice data to a server, such that the server recognizes a content from the voice data; a voice instruction returned from the server according to the recognized content, where the voice instruction includes a plurality of fields each with a field value, and a first field of the plurality of fields is associated with a first food editing item of the food editing items; and a field value of the first field is used to update content of the first food editing item.

In some embodiments, the food editing items include food name editing item, and updating the item contents of the food editing items according to the recognized content from voice data includes: if the RFID tag is a user-defined tag, updating the item contents of all the food editing items associated with user-defined tag according to the recognized content from voice data; and if the RFID tag is not a user-defined tag, updating the item contents of the food editing items except the food name editing item according to the recognized content from voice data.

In some embodiments, if the RFID tag is not a user-defined tag, the method further includes: determining whether a food name in the recognized content is the same as a preset food name in the preset food information; and if the food name in the recognized content is different from the preset food name in the preset food information, presenting a text prompt on the interface, and alternatively, playing a voice prompt, where the text prompt and the voice prompt are configured for prompting the user that food name for the RFID tag is not available for edition. For example, if a preset food name corresponding to a currently detected RFID tag is "apple", and a field value corresponding to a field name "name" in the voice instruction is "beef", because the two does not match, a text prompt or a voice prompt is provided for the user. If the preset food name corresponding to the currently detected RFID tag is "beef", and the field value corresponding to the field name "name" in the voice instruction is also "beef", it is unnecessary to pop up a text prompt or play a voice prompt.

In some embodiments, the processor is further configured for: receiving a confirmation operation for a specified control on the food editing interface; generating food information according to updated item contents of all food editing items in response to the confirmation operation; and storing the tag code of the RFID tag and the food information in local data.

Figure 12:
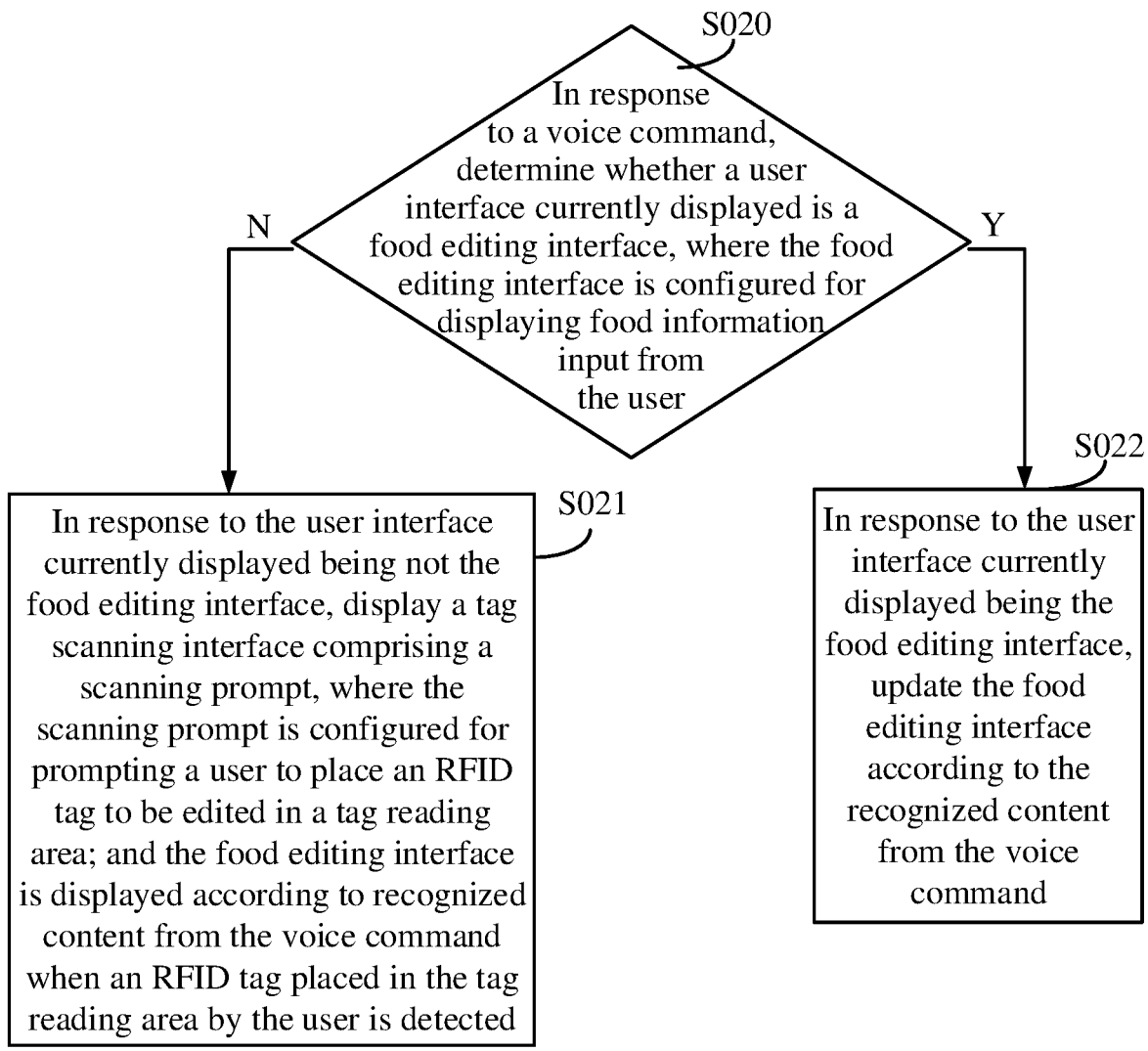
FIG. 12 shows a flowchart of another method for editing food information according to an embodiment of the present application.

FIG. 12 shows a flowchart of another method for editing food information according to an embodiment of the present application. As shown in FIG. 12, the method may include the following.

S020, in response to a voice command, determining whether a user interface currently displayed is a food editing interface, where the food editing interface is configured for displaying food information input from the user.

S021, in response to the user interface currently displayed being not the food editing interface, displaying a tag scanning interface comprising a scanning prompt, where the scanning prompt is configured for prompting a user to place an RFID tag to be edited in a tag reading area; and the food editing interface is displayed according to recognized content from the voice command when an RFID tag placed in the tag reading area by the user is detected.

S022, in response to the user interface currently displayed being the food editing interface, updating the food editing interface according to the recognized content from the voice command.

In the above embodiments, the user may first place the RFID tag to be edited in the tag reading area. In this case, the RFID tag is detected by a processor and the food editing interface is displayed. Then, the user inputs a voice command by saying a preset voice command, where the preset voice command includes food information to be edited by the user, for example, by saying "I want to define 2 kilograms of beef". In some other embodiments, the user may input the preset voice command by saying the preset command before placing the RFID tag to be edited in the tag reading area. The preset voice command is configured for triggering an editing process, and further includes the food information to be edited by the user, for example, by saying "I want to define 2 kilograms of beef".

It may be seen that based on the method for editing food information according to the embodiments of the present application, the user may edit food information associated with the RFID tag through voice input. Specifically, when the RFID tag placed in the tag reading area by the user is detected, the voice recognition interface is displayed while the food editing interface is displayed, that is, a voice assistant application is automatically switched to run in the foreground of the display apparatus to enter a voice detection state rapidly and detect voice input from the user in time. As such, the user may enable the refrigerator to automatically complete an information input process by saying food information that he/she wants to edit, such that user operations are reduced, an editing process is faster, and user experience is improved.

Figure 13:
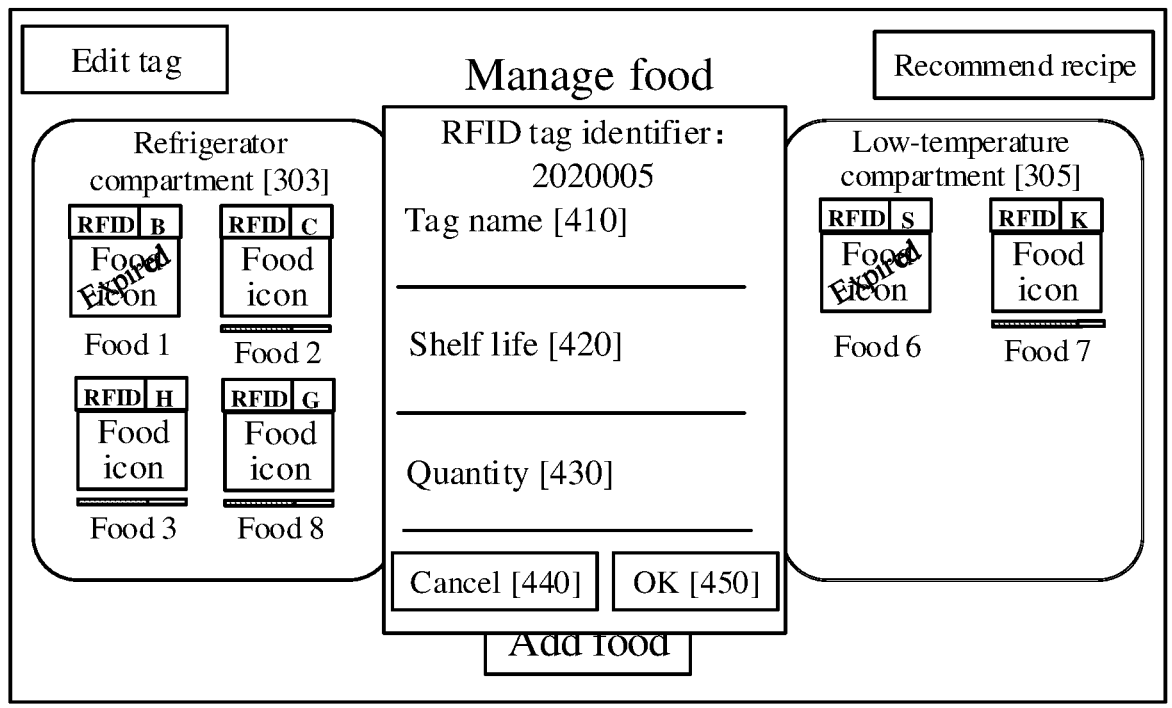
FIG. 13 shows a food editing interface according to an embodiment of the present application.

FIG. 13 shows a food editing interface according to an embodiment of the present application. As shown in FIG. 13, identifier information "20200005" of the RFID tag is presented on the food editing interface. In this way, the user does not need to manually input the identifier information, such that input errors are avoided, and user operations are reduced. A plurality of input items are further displayed, and comprise a food name input item 410, a food shelf life input item 420 and a food quantity input item 430. Each food input item has to an input area for inputting a corresponding content. In addition, a "Cancel" control 440 and an "OK" control 450 are displayed. After information input is completed, a user may click the "OK" control to save food information input in this input process, or click the "Cancel" control to return to a previous interface.

In some embodiments, a process of displaying the food editing interface by a processor may include: firstly, determining whether corresponding food information exists in a food information collection according to identifier information of a tag to be edited; if the corresponding food information exists in the food information collection, a content corresponding to the input item is presented on the food editing interface according to the food information input from the user; and if no corresponding food information exists in the food information collection, an item content corresponding to an editing item is presented on the food editing interface according to preset filling information.

Figure 14:
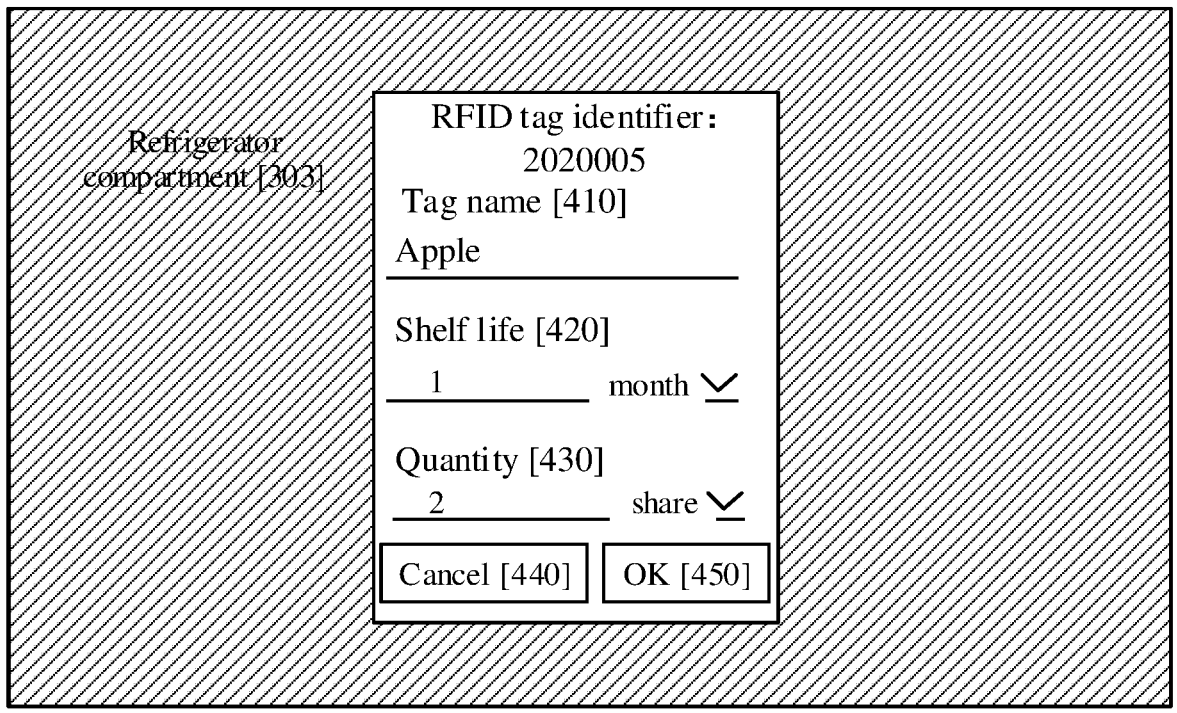
FIG. 14 shows another food editing interface according to an embodiment of the present application.

In an example, whether corresponding food information exists in the food information collection is determined according to the identifier information of the tag to be edited, which includes apples, 60 days and 1000 g. A food editing interface is as shown in FIG. 14. With reference to FIG. 14, on the food editing interface, an input content corresponding to the "Tag name" is "Apple", an input content corresponding to the "Shelf life" is "60 days", and an input content corresponding to the "Quantity" is "1000 g". By the food editing interface, the user may learn food information associated with the tag to be edited in advance, and may also input new food information by modifying the input content presented.

Figure 15:
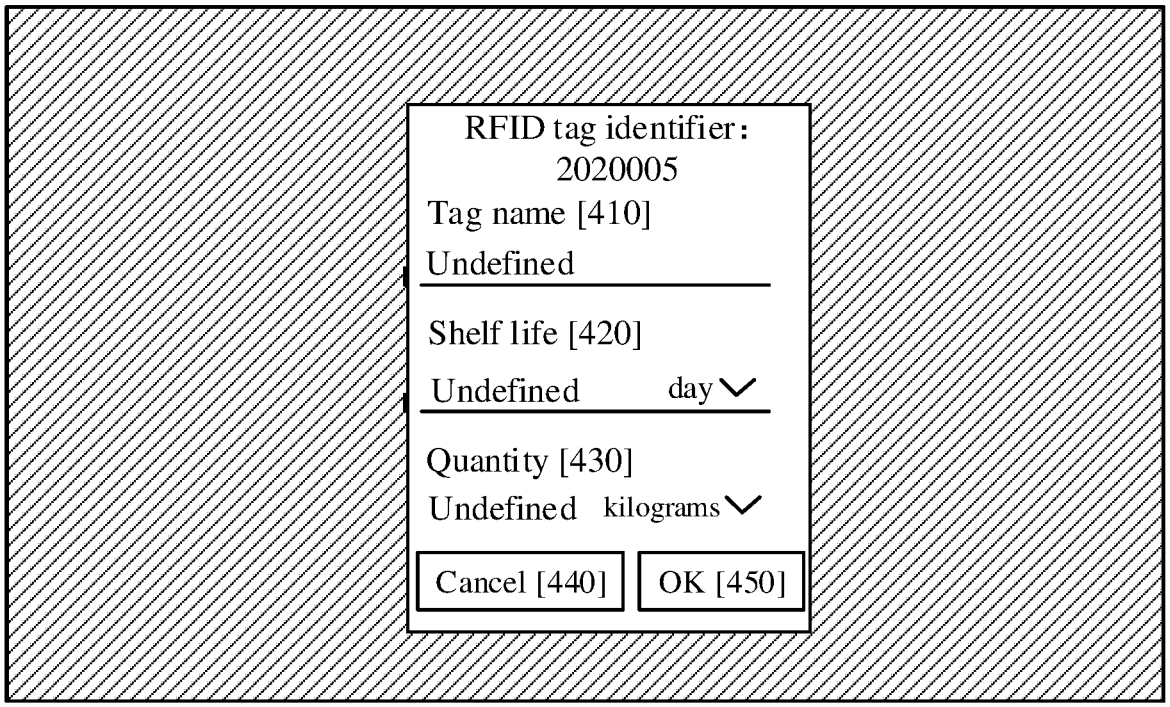
FIG. 15 shows still another food editing interface according to an embodiment of the present application.

In another example, it is determined that no corresponding food information exists in the food information collection according to the identifier information of the tag to be edited. A displayed food editing interface is as shown in FIG. 15. With reference to FIG. 15, on the food editing interface, input contents corresponding to the "Tag name", the "Shelf life" and the "Quantity" each are "Undefined". By the food editing interface, the user may learn that a target tag is a new tag, and may input food information associated with the tag to be edited by inputting a content of each editing item.

It should be noted that on the food editing interfaces shown in FIG. 13-FIG. 15, measuring units are displayed by default at input areas corresponding to the "Shelf life" and "Quantity". For example, in FIG. 13, a measuring unit of the shelf life is displayed as "day" and a measuring unit of the quantity is displayed as "g". In FIG. 14, a measuring unit of the shelf life is displayed as "month" and a measuring unit of the quantity is displayed as "share". In addition, in FIG. 15, a measuring unit of the shelf life is displayed as "day" and a measuring unit of the quantity is displayed as "kilogram". When the food editing interface is displayed, the user may set the measuring units/measuring unit of the shelf life and/or food quantity according to requirements. For example, when a food management interface as shown in FIG. 13 is displayed, the user may control a displayed measuring unit option by clicking a pull-down control next to the measuring unit.

Figure 16:
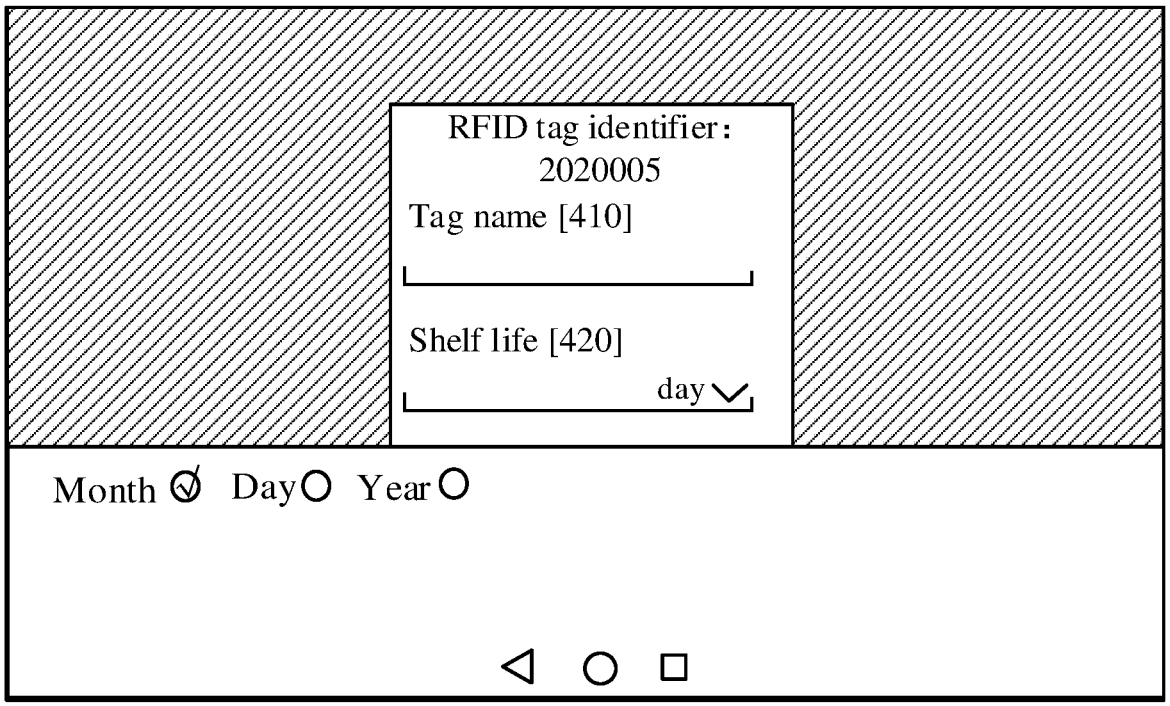
FIG. 16 shows still another food editing interface according to an embodiment of the present application.

For example, when the food editing interface as shown in FIG. 13 is displayed, the user may control a measuring unit option of the shelf life to pop up by clicking a pull-down control next to the measuring unit of the shelf life, as shown in FIG. 16. After the measuring unit option of the shelf life pops up, the user may select a measuring unit to be set through a clicking operation. For example, as shown in FIG. 16, after the user selects "month", the measuring unit option is folded up, and a measuring unit presented on the food editing interface changes from "day" to "month".

Figure 17:
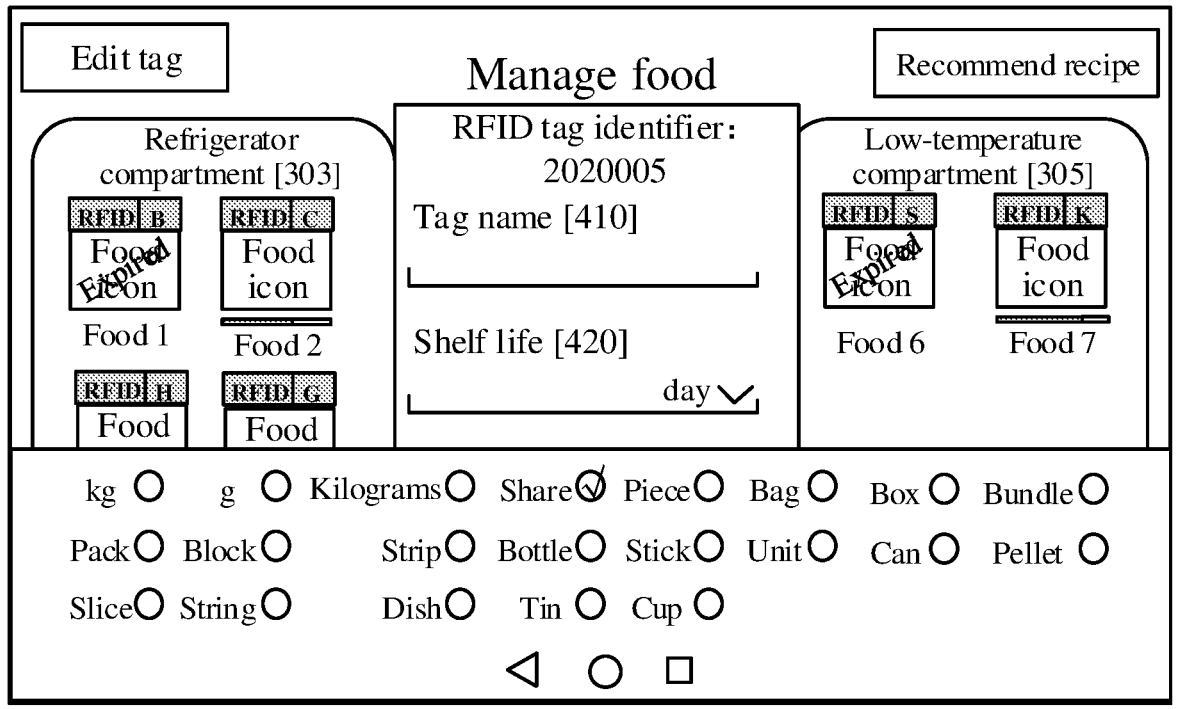
FIG. 17 shows still another food editing interface according to an embodiment of the present application.

For example, when the food editing interface as shown in FIG. 13 is displayed, the user may control a measuring unit option of the food quantity to pop up by clicking a pull-down control next to the measuring unit of the food quantity, as shown in FIG. 17. After the measuring unit option of the food quantity pops up, the user may select a measuring unit to be set through a clicking operation. For example, as shown in FIG. 17, after the user selects "share", the measuring unit option is folded up, and a measuring unit presented on the food editing interface changes from "g" to "share".

In some embodiments, when the food editing interface is displayed, the user may input the food information by means of voice command. The voice command may include one or more pieces of operation information, such as instruction information for operating a food name, instruction information for operating a food shelf life and instruction information for operating quantity of a food. For example, when the food editing interface is displayed, if the user says, "define a tag of 2 kilogram of beef", the processor may obtain instruction information for operating a food name and instruction information for operating a food quantity by parsing the voice command. For example, when the food editing interface is displayed, if the user says, "define a shelf life of 3 months", the processor may obtain instruction information for operating a food shelf life by parsing the voice command. Furthermore, the processor may input a content corresponding to a corresponding item according to the instruction information parsed and display the content on the food editing interface, and the user does not need to input texts. In this way, user operations may be further reduced, such that an editing process may be faster; and universality of the function may be improved, such that elders or children who are incapable of typing may realize edition of food information.

In some embodiments, when the processor detects the RFID tag placed in a tag reading area, a voice recognition content area is presented on the food editing interface, and reception and recognition for the voice command from the user are started. The voice recognition content area may display an input prompt and a recognized content from voice data. In some embodiments, a food editing area and the voice recognition content area may be presented in two different view display areas. Different view display areas may be areas belonging to the same layer or areas belonging to different layers.

Figure 18:
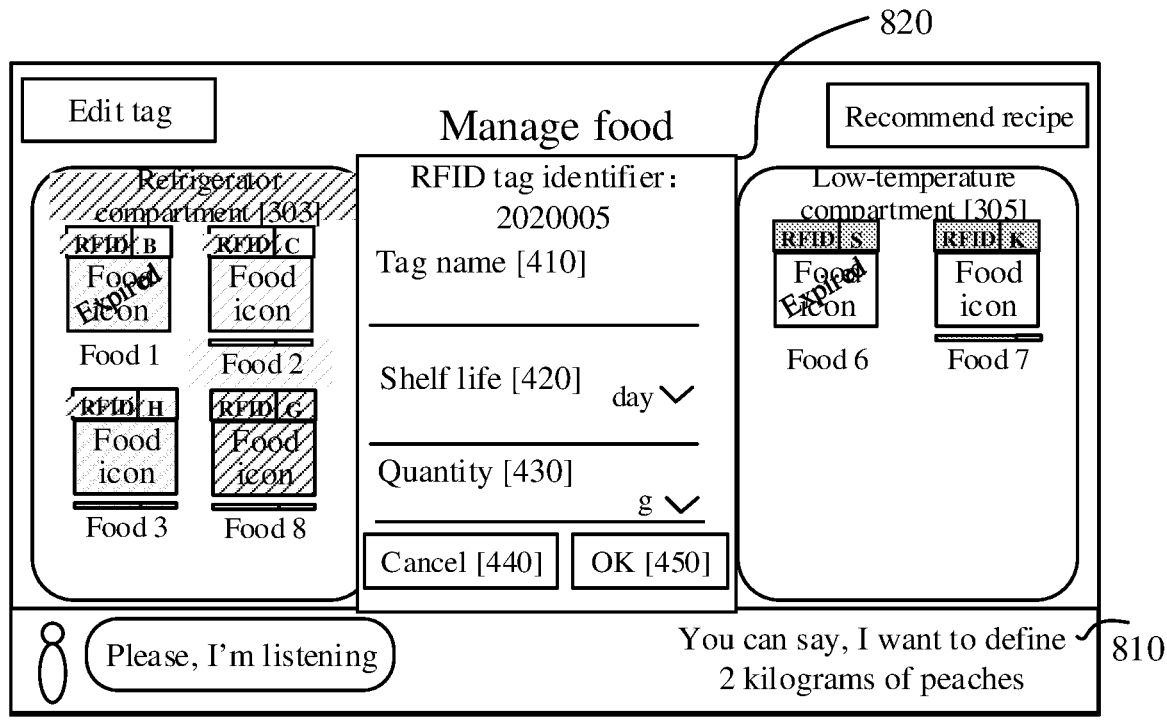
FIG. 18 shows still another food editing interface according to an embodiment of the present application.

FIG. 18 shows a food editing interface including a voice recognition content area according to some embodiments of the present application. As shown in FIG. 18, a voice recognition content area 810 is displayed at a top layer of the food editing interface, and does not overlap with a food editing area 820. An input prompt is presented on the voice recognition content area 810, and comprises a text prompt with a content that "you can say, I want to define 2 kilograms of peaches". When a voice command input from a user is received and a voice content is recognized, the voice recognition content area may also display the recognized content from voice data.

In some embodiments, a processor receives the voice command input from the user and transmits voice command data to a server; and the server obtains recognized content by parsing the voice command data and generates voice instruction information according to the recognized content. The voice instruction information includes a plurality of fields each with a filed value, a field corresponds to a food input item, a field name is an item name, and a field value is an operation type and/or operation data. The server returns voice instruction to the processor, and the processor operates a corresponding input item according to a field value of each field in the voice instruction information, and displays a content of the corresponding input item.

In some embodiments, the voice instruction information includes first instruction information, the first instruction information is configured for operating a food shelf life, the first instruction information includes first operation data, the first operation data includes a first operation value and a first time unit, and the first operation value carrying the first time unit is an original recognized content obtained by directly parsing a voice command. For example, if the voice command input from the user is "I want to define 2 kilograms of beef with a shelf life of 3 months", the first operation value carrying the first time unit is "3 months".

In some embodiments, after obtaining the first instruction information for operating a food shelf life by parsing the input voice command, the processor determines second instruction information according to the first instruction information. The second instruction information includes a target operation type and second operation data, the second operation data includes a second operation value and a second time unit, and the second time unit is one of preset time units. Then, an input content corresponding to the food shelf life is presented on the food editing interface according to the target operation type and the second operation data.

In a process of generating the second instruction information according to the first instruction information, the processor firstly determines whether the first time unit is a preset time unit and whether the first operation value is an integer. If the first time unit is the preset time unit and the first operation value is an integer, it is necessary to determine the first time unit as the second time unit and the first operation value as the second operation value, instead of processing operation values and units in the first instruction information. If the first time unit is not a preset time unit or the first operation value is not an integer, it is necessary to process the operation values and units in the first instruction information, specifically, by converting the first operation value to the second operation value in the preset time unit according to a conversion relationship between the first time unit and the preset time unit and ensuring that the second operation value is an integer.

In some implementations, the preset time unit includes a month and a day. The first operation value is converted to the second operation value in month or day when the first time unit is a year or a month; and the first operation value is converted to the second operation value in day when the first time unit is a week or a day. Specifically, if the first time unit is a year and the first operation value is an integer, such as 3 years, it is necessary to use the first operation value carrying the first time unit as the second operation value, instead of processing the time unit and operation value. If the first time unit is a year and the first operation value is not an integer, such as 2.5 years, it is necessary to convert the first operation value to the second operation value in month, that is, 2.5×12 months. If the first time unit is a month and the first operation value is an integer, such as 3 months, it is necessary to use the first operation value carrying the first time unit as the second operation value, instead of processing the time unit and operation value. If the first time unit is a month and the first operation value is not an integer, such as 2.5 months, it is necessary to convert the first operation value to the second operation value in day, that is, 2.5×30 days. If the first time unit is a week, since a week is not a preset time unit, regardless of whether the first operation value is an integer, it is necessary to convert the first operation value to the second operation value in day. For example, it is necessary to convert 3 weeks to 3×7 days. If the first time unit is a day and the first operation value is an integer, it is unnecessary to process the time unit and operation value. If the first time unit is a day and the first operation value is not an integer, it is necessary to obtain the second operation value in day by rounding down the first operation value. For example, 2 days is obtained by rounding down 2.5 days, and 3 days is obtained by rounding down 3.4 days.

In addition, it should be noted that when the user inputs the food information through voice control, the input voice command may further include an operation type of operating a food shelf life, and the operation type may include an extension operation, a shortening operation and a setting operation. It should be understood that if the input voice command includes an operation type supported by the refrigerator, the first instruction information obtained by parsing the voice command naturally includes the operation type. If the input voice command includes no operation type supported by the refrigerator, the first instruction information includes no operation type. For example, when the food editing interface is displayed, if the user says "extend a shelf life by 3 months", an operation type in the voice command is the extension operation; if the user says "shorten a shelf life by 2 months", an operation type in the voice command is the shortening operation; and if the user says "define a shelf life of 3 months", an operation type in the voice command is the setting operation.

In view of this, in the process of generating the second instruction information according to the first instruction information, an operation type is determined as a target operation type if the first instruction information further includes the operation type; and a preset operation type is determined as the target operation type if the first instruction information includes no operation type. As an implementation, the preset operation type may be the setting operation. That is, when the first instruction information includes no operation type, the setting operation is determined as the target operation type.

The processor determines display data according to the target operation type and the second operation data, where the display data includes a display value and the second time unit. After obtaining the display value in the second time unit, the processor causes the display value carrying the second time unit as an input content corresponding to the food shelf life to be presented on the food editing interface. In this way, when a time measuring unit presented on the food editing interface is inconsistent with a measuring unit of a shelf life in the voice command of the user, an operation for the food shelf life may be completed, and the refrigerator may display a time measuring unit said by the user, such that user experience is improved.

Specifically, the second operation value is determined as the display value when the target operation type is the setting operation.

When the target operation type is the extension operation, a pre-stored shelf life value and the second operation value are converted to a first intermediate value and a second intermediate value in an intermediate time unit respectively; an intermediate sum in the intermediate time unit is obtained by adding the first intermediate value and the second intermediate value; and the intermediate sum is converted to the display value in the second time unit. To save a computing load, a storage time unit that is preset may be used as the intermediate measuring unit, and the storage time unit is a unit of the pre-stored shelf life value. For example, the storage time unit is a second, the pre-stored shelf life value is 200000 (seconds), and the second operation value is 3 (days). According to the above method for determining a display value, in the example, it is necessary to convert the second operation value 3 (days) to 3×24×60×60 (seconds) and then add the value to the pre-stored shelf life value of 200000 so as to obtain 261200 (seconds). Finally, 261200 (seconds) is converted to a display value in day, and rounded down to obtain 5 days.

Alternatively, according to a conversion relationship between the second time unit and the storage time unit, the pre-stored shelf life value is converted to a value in the second time unit, then the value is added to the second operation value, and finally the display value in the second time unit is obtained.

When the target operation type is the shortening operation, the pre-stored shelf life value and the second operation value are converted to the first intermediate value and the second intermediate value in the intermediate time unit respectively; an intermediate difference in the intermediate time unit is obtained by subtracting the first intermediate value from the second intermediate value; and the intermediate difference is converted to the display value in the second time unit. For example, the storage time unit is a second, the pre-stored shelf life value is 200000 (seconds), and the second operation value is 3 (days). According to the above method for determining a display value, if the storage time unit (a second) is used as the intermediate time unit, it is necessary to convert the second operation value 3 (days) to 3×24×60×60 (seconds) and then subtract the value from the pre-stored shelf life value of 200000 so as to obtain 59200 (seconds). Finally, 59200 (seconds) is converted to a display value in day, and rounded down to obtain 0 day.

Alternatively, according to the conversion relationship between the second time unit and the storage time unit, the pre-stored shelf life value is converted to the value in the second time unit, then the value is subtracted from the second operation value, and finally the display value in the second time unit is obtained.

Figure 19:
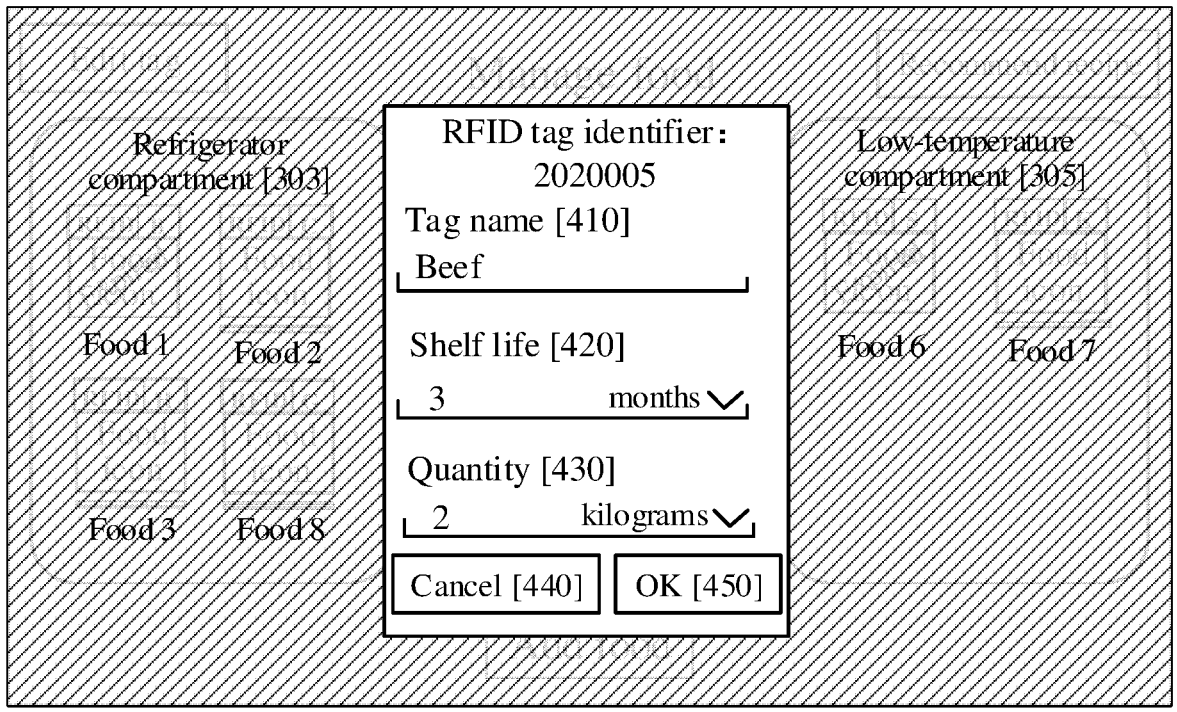
FIG. 19 shows still another food editing interface according to an embodiment of the present application.

For example, when the food editing interface is displayed, in response to the voice command "I want to define 2 kilograms of beef with a shelf life of 3 months" input from the user, in a food management interface, a content corresponding to a tag name may be displayed as "beef", a content corresponding to a food shelf life may be displayed as "3 months", and a content corresponding to a food quantity may be displayed as "2 kilograms", as shown in FIG. 19.

After inputting a content of each input item on the food editing interface, the user may input an OK operation by clicking an "OK" control on the food editing interface. In response to the OK operation received from the user on the food editing interface, the processor stores received food information input from the user and identifier information of a tag to be edited correspondingly in a food information collection.

In the above embodiments, when the target operation type is the shortening operation or the extension operation, the second operation value is converted to the second intermediate value in the storage time unit. On the one hand, it is convenient to compute the display value, and on the other hand, the intermediate sum or the intermediate difference in the storage time unit may be directly used to update the pre-stored shelf life value, such that the shortening operation or extension operation for the shelf life may be realized. The second operation value (also called the display value) is converted to the shelf life value in the storage time unit and the shelf life value is stored in the food information when the target operation type is the setting operation.

In addition, in response to an OK operation, the processor further cancels the food editing interface, displays the food management interface, and updates the food management interface according to the food information input. For example, food icons generated according to the food information input are newly added in the updated food management interface.

It should be understood that compared with the food management interface before update, some updated food management interfaces may display new food icons, which are food icons corresponding to newly added foods. In some updated food management interfaces, since shelf lives of some foods are extended or shortened, freshness identities of some food icons are updated.

It may be seen that based on the refrigerator according to the embodiments of the present application, the user may obtain the target operation type and the first operation data for operating the food shelf life by parsing the voice command when operating the food shelf life by the voice command, where the first operation data includes the first operation value and the first time unit. Then, the second operation data corresponding to the first operation data is determined, where the second operation data includes the second operation value and the second time unit, and the second time unit is the preset time unit. Finally, according to the target operation type and the second operation data, the food shelf life is operated, and the input content corresponding to the food shelf life is presented on the food editing interface. Therefore, even if a time unit in the voice command is inconsistent with the preset time unit, the operation for the food shelf life may be realized, and user experience may be improved.

In some embodiments, the processor receives a voice command input from the user and transmits voice command data to the server; and the server obtains a recognized content by parsing the voice command data and generates voice instruction information according to the recognized content. The voice instruction information includes a plurality of fields each with a field value, one field corresponds to one food input item, a field name is an item name, and a field value is an operation type and/or operation data. The server returns the voice instruction information generated to the processor, and the processor operates a corresponding input item according to a field value of each field in the voice instruction information, and displays a content of the corresponding input item.

In some embodiments, the processor obtains instruction information for operating a food quantity by parsing the input voice command. The instruction information includes an operation type and target operation data, and the target operation data includes a target operation value and a target measuring unit. The target operation value carrying the target measuring unit is an original recognized content obtained by directly parsing the voice command. For example, if the voice command input from the user is "I want to define 2 kilograms of beef", the target operation value carrying the target measuring unit is "2 kilograms". As an implementation, the operation for a food quantity includes an input operation and a modification operation. The input operation is to store a target operation value indicated in the voice command if there is no pre-stored food quantity. The modification operation is to increase or decrease the pre-stored food quantity according to the target operation value indicated in the voice command.

It should be noted that in some implementations, the processor parses the input voice command via the server, and the server obtains recognized content by parsing the voice command and returns the recognized content to the processor of the refrigerator. According to the recognized content returned from the server, the processor of the refrigerator determines instruction information for operating a food quantity. In some other implementations, the processor parses the input voice command via the server, and the server obtains the recognized content by parsing the voice command, determines instruction information for operating a food quantity according to the recognized content, and returns the instruction information to the processor of the refrigerator. The instruction information includes a target operation value carrying a target measuring unit.

In the above implementations, after obtaining the target measuring unit and the target operation value by parsing the voice command, the server or the processor of the refrigerator determines whether the target measuring unit is a preset measuring unit and whether the target operation value falls within a preset operation range of the target measuring unit; and the target operation data including a target operation value and a target measuring unit is obtained if the target measuring unit is the preset measuring unit and the target operation value falls within the operation range. If the target measuring unit is not a preset measuring unit or the target operation value does not fall within the operation range, the flow is ended. For example, the preset measuring units may be divided into weight measuring units, singular measuring units and plural measuring units. The measuring units may include kg, g and etc., the singular measuring units may include bundle, part, piece, block, strip, bottle, stick, portion, pellet, slice, string, dish, tin, cup, can, etc. The plural measuring units may include packs, bags, boxes, etc.

It should be noted that when the voice command input from the user includes operation type information, the server may obtain the operation type information by parsing the voice command; but when the voice command input from the user includes no operation type information, the server cannot obtain operation type information by parsing the voice command. if the server fails to obtain operation type information by parsing the voice command, or the parsed operation type is not one of the operation types supported by the processor of the refrigerator, the input operation is used as a target operation, so as to determine an operation type for indicating the input operation.

After obtaining instruction information for operating a food quantity by parsing a voice command from a user, the processor determines the target display value in the target measuring unit according to the operation type and the target operation data in the instruction information, and displays the target display value and the target measuring unit as input contents corresponding to the food quantity on the food editing interface. The step that the target display value is determined may include: when the operation type indicates an input operation, determining the target operation value in the instruction information as the target display value. For example, a voice command input from the user is "I want to define 2 kilograms of beef". According to the voice command, the operation type is determined as an input operation, the target operation value is 2, and the target measuring unit is kilogram. In the example, the target display value is the target operation value, that is, 2. In this way, even if a quantity measuring unit presented on the food editing interface is inconsistent with a quantity measuring unit in the voice command of the user, the input operation for the food quantity may be realized. The user only needs to say the preset measuring unit as the quantity measuring unit, instead of inputting a voice command according to the quantity measuring unit presented on the display. The refrigerator may display the quantity measuring unit said by the user when the quantity measuring unit said by the user is inconsistent with a current default measuring unit presented on the display, such that user experience is improved.

When the operation type indicates a modification operation, whether the target measuring unit matches the pre-stored measuring unit in category is determined firstly. The pre-stored measuring unit is a pre-stored food quantity measuring unit. If the target measuring unit matches the pre-stored measuring unit in category, a sum of the pre-stored food quantity value and the target operation value is determined as a target display value when the operation type indicates an increase operation; and the difference between the pre-stored food quantity value and the target operation value is determined as a target display value when the operation type indicates a decrease operation. In this way, when the user modifies the pre-stored food quantity through voice control, the modification operation may be realized only by uttering the quantity measuring unit which matches the pre-stored measuring unit in category in the voice command of the user, instead of uttering the quantity measuring unit perfectly consistent with the pre-stored measuring unit in the voice command of the user. The refrigerator may display the quantity measuring unit said by the user when the quantity measuring unit said by the user is inconsistent with a current default measuring unit, such that user experience is improved. Predetermined prompt information is displayed at an upper layer of the food editing interface to prompt the user that the food shelf life cannot be operated according to the input voice command if the target measuring unit does not match the pre-stored measuring unit in category.

Figure 20:
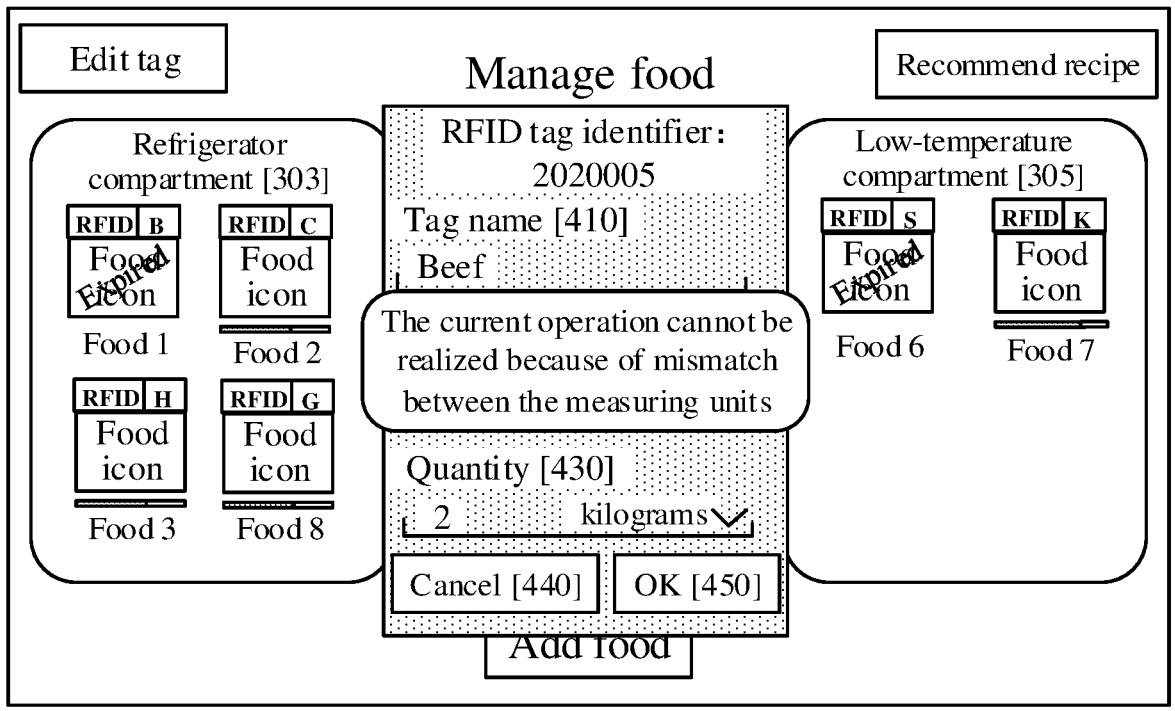
FIG. 20 shows still another food editing interface according to an embodiment of the present application.

In some implementations, the processor determines both the target measuring unit and the pre-stored measuring unit are weight units, singular measuring units or plural measuring units; and it is determined that the target measuring unit matches the pre-stored measuring unit in category if both the target measuring unit and the pre-stored measuring unit are weight units, singular measuring units or plural measuring units. In an example, the input voice command is "I want to define 5 bags of beef", that is, the target measuring unit is "bags", and the pre-stored measuring unit is "kilogram", which belongs to a weight measuring unit. In the example, since "bags" belongs to a plural measuring unit, and "kilogram" belongs to a weight measuring unit, the two do not fall within a category and does not match in category. Therefore, it is necessary to display prompt information as shown in FIG. 20 on the food editing interface, specifically, "The current operation cannot be realized because of mismatch between the measuring units".

It should be noted that if both the target measuring unit and the pre-stored measuring unit are weight units, the processor determines the target display value, which includes: determining whether the target measuring unit is consistent with the pre-stored measuring unit; converting the pre-stored food quantity to an intermediate value in the target measuring unit when the target measuring unit is inconsistent with the pre-stored measuring unit; and determining a target display value according to the target operation value and the intermediate value, that is, if the operation type indicates an increase operation, the sum of the intermediate value and the target operation value is determined as the target display value; and if the operation type indicates a decrease operation, the difference between the intermediate value and the target operation value is determined as the target display value.

Figure 21:
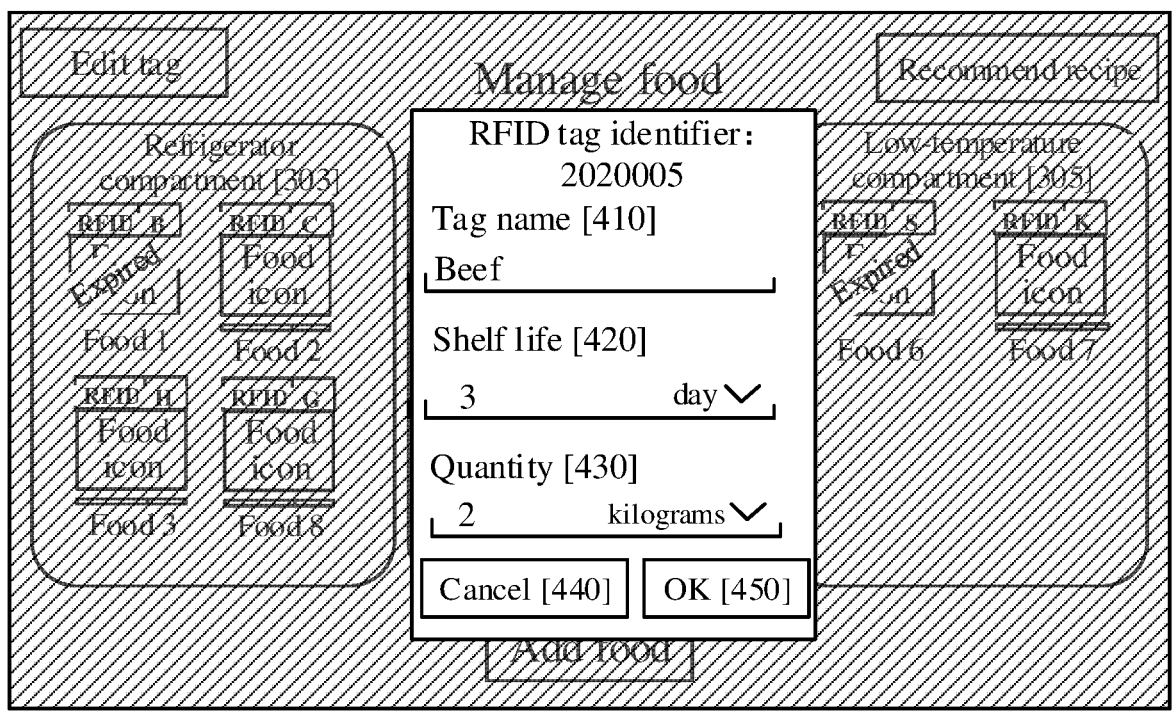
FIG. 21 shows still another food editing interface according to an embodiment of the present application.

For example, when the food editing interface is displayed, in response to a voice command "I want to define 2 kilograms of beef with a shelf life of 3 months" input from the user, in the food management interface, the content corresponding to the tag name may be displayed as "beef", the content corresponding to the food shelf life may be displayed as "3 months", and the content corresponding to the food quantity may be displayed as "2 kilograms", as shown in FIG. 21.

After inputting the content of each input item on the food editing interface, the user may input a confirmation operation by clicking the "OK" control on the food editing interface. In response to reception of the confirmation operation, the processor stores food information received from the user and the identifier information of the tag to be edited correspondingly in the food information collection. When the operation for the food quantity is an input operation, the target display value carrying the target measuring unit is used as one piece of the food information and stored in the food information collection. When the operation for the food quantity is a modification operation, the target display value and the target measuring unit are used to update the pre-stored food quantity value and the measuring unit.

In addition, in response to the confirmation operation, the processor further cancels the food editing interface, displays a food management interface, and updates the food management interface according to the food information input from the user. For example, the food icons generated according to the food information input are newly added in the updated food management interface.

It may be seen that based on the refrigerator according to the embodiments of the present application, when the food editing interface is displayed, the user may input or modify the food quantity by inputting a voice command. When the food quantity is input through voice control, even if the quantity measuring unit presented on the food editing interface is inconsistent with the quantity measuring unit in the voice command of the user, the input operation may be realized. The user only needs to say a preset measuring unit as the quantity measuring unit in category, instead of inputting a voice command according to the quantity measuring unit presented on the display. When the pre-stored food quantity is modified through voice control, the modification operation may be realized only by uttering the quantity measuring unit in the voice command of the user which matches the pre-stored measuring unit in category, instead of uttering the quantity measuring unit in the voice command of the user perfectly consistent with the pre-stored measuring unit word by word. The refrigerator may present the quantity measuring unit said by the user when the quantity measuring unit said by the user is inconsistent with the default measuring unit currently presented on the display, such that user experience is improved.

Some embodiments of the present application further provide a voice control method. The method can be performed by, but is not limited to, a processor of a refrigerator. For example, when a television is connected with the refrigerator via a cloud, foods in the refrigerator via the cloud server may be viewed and edited through the television, for example, by starting applications related to the smart home. Foods may be edited on the television by a pre-installed voice assistant, or by pressing keys of the processor or through touch operations. After the foods are edited through the television, edited information is synchronized to the refrigerator via the cloud.

Figure 22:
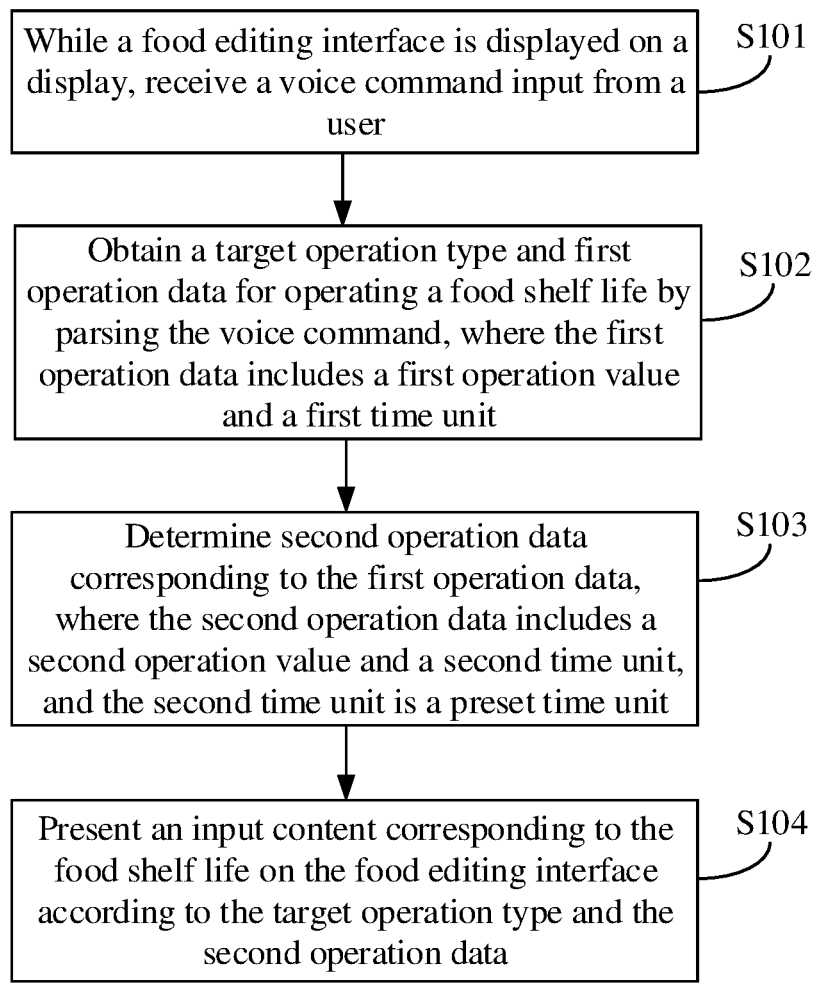
FIG. 22 shows a flowchart of a voice control method according to an embodiment of the present application.

FIG. 22 shows a flowchart of a voice control method according to an embodiment of the present application. As shown in FIG. 22, the method may include the following process.

S101, while a food editing interface is displayed on a display, receiving a voice command input from a user.

S102, obtaining a target operation type and first operation data for operating the food shelf life by parsing the voice command, where the first operation data includes a first operation value and a first time unit.

S103, determining second operation data corresponding to the first operation data, where the second operation data includes a second operation value and a second time unit, and the second time unit is a preset time unit.

In some embodiments, determining the second operation data corresponding to the first operation data includes: determining the first time unit as the second time unit and the first operation value as the second operation value in response to the first time unit being consistent with the preset time unit and the first operation value being an integer; and converting the first operation value to the second operation value in the preset time unit in response to the first time unit being not consistent with the preset time unit or the first operation value being not an integer, where the second operation value is an integer.

In some embodiments, the preset time unit includes a month and a day; and converting the first operation value to the second operation value in the preset time unit in response to the first time unit being not consistent with the preset time unit or the first operation value being not an integer includes:

converting the first operation value to the second operation value in month or day when the first time unit is a year or a month; and convert the first operation value to the second operation value in day when the first time unit is a week or a day.

In some embodiments, obtaining the target operation type for operating the food shelf life by parsing the voice command includes: when first instruction information further includes an operation type, determining an operation type as the target operation type; and when the first instruction information includes no operation type, determining a preset operation type as the target operation type.

S104, presenting an input content corresponding to the food shelf life on the food editing interface according to the target operation type and the second operation data.

In some embodiments, presenting the input content corresponding to the food shelf life on the food editing interface according to the target operation type and the second operation value in the second time unit includes: determining display data according to the target operation type and the second operation data, where the display data includes a display value and the second time unit; and the display data is presented as the input content corresponding to the food shelf life on the food editing interface.

In some embodiments, the target operation type includes an extension operation, a shortening operation and a setting operation, and determining the display data according to the target operation type and the second operation data includes: determining the second operation value as the display value when the target operation type is a setting operation; determining the display value according to the sum of a pre-stored shelf life value and the second operation value when the target operation type is an extension operation; and determining the display value according to a difference between a pre-stored shelf life value and the second operation value when the target operation type is a shortening operation.

In some embodiments, determining the display value according to the sum of the pre-stored shelf life value and the second operation value when the target operation type is the extension operation includes: converting the pre-stored shelf life value and the second operation value to a first intermediate value and a second intermediate value in an intermediate time unit respectively; obtaining an intermediate sum in the intermediate time unit by adding the first intermediate value and the second intermediate value; and converting the intermediate sum to the display value in the second time unit.

Determining the display value according to the difference between the pre-stored shelf life value and the second operation value when the target operation type is the shortening operation includes: converting the pre-stored shelf life value and the second operation value to a first intermediate value and a second intermediate value in an intermediate time unit respectively; obtaining an intermediate difference in the intermediate time unit by subtracting the first intermediate value from the second intermediate value; and converting the intermediate difference to the display value in the second time unit.

In some embodiments, the intermediate time unit is consistent with a storage time unit. The display value is converted to a shelf life value in the storage time unit and the shelf life value is stored in the food information when the target operation type is the setting operation. The intermediate difference is used to update the pre-stored shelf life value when the target operation type is the shortening operation. The intermediate sum is used to update the pre-stored shelf life value when the target operation type is the extension operation.

In some embodiments, the display value is converted to a shelf life value in a storage time unit that is preset; and the shelf life value is used to be stored in the food information.

It may be seen the voice control method from the above embodiments, the user may obtain the target operation type and the first operation data for operating the food shelf life by parsing the voice command when operating the food shelf life by voice command, where the first operation data includes the first operation value and the first time unit. Then, the second operation data corresponding to the first operation data is determined, where the second operation data includes the second operation value and the second time unit, and the second time unit is the preset time unit in the local device. Finally, according to the target operation type and the second operation data, the food shelf life is operated, and the input content corresponding to the food shelf life is presented on the food editing interface. Therefore, even if a time unit in the voice command is inconsistent with the preset time unit, operation for the food shelf life may be realized, and user experience may be improved.

Figure 23:
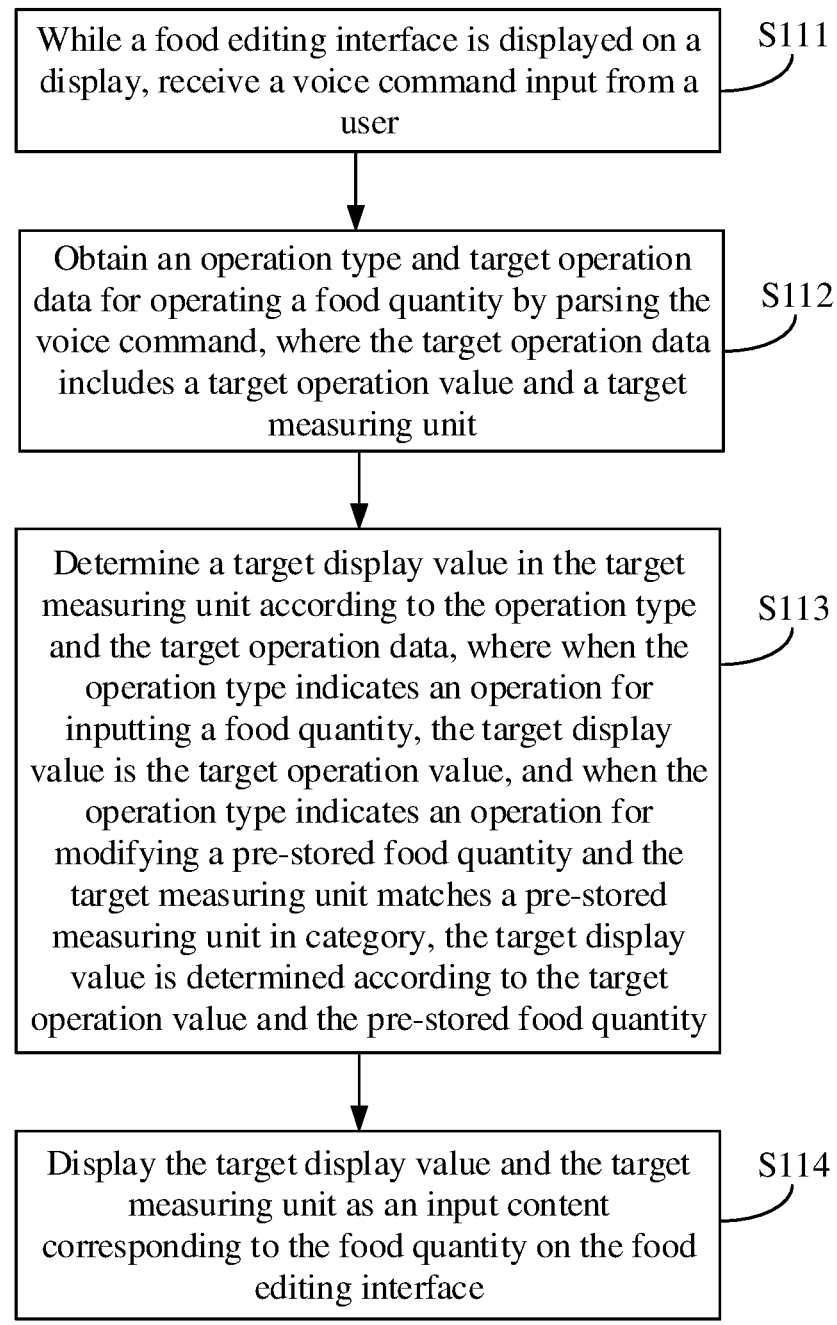
FIG. 23 shows a flowchart of a voice control method according to an embodiment of the present application.

Based on the refrigerator according to the embodiments of the present application, an embodiment of the present application further provides a voice control method. As shown in FIG. 23, the method may include the following.

S111, while a food editing interface is displayed on a display, receiving a voice command input from a user.

S112, obtaining an operation type and target operation data for operating a food quantity by parsing the voice command, where the target operation data includes a target operation value and a target measuring unit.

In some embodiments, when no operation type is obtained by parsing the voice command, an operation type for indicating an operation for inputting a food quantity is determined.

In some embodiments, after the target measuring unit and the target operation value are obtained by parsing the voice command, whether the target measuring unit is a preset measuring unit and whether the target operation value falls within a preset operation range of the target measuring unit are determined; and the target operation data including the target operation value and the target measuring unit is determined if the target measuring unit is the preset measuring unit and the target operation value falls within the operation range.

S113, determining a target display value in the target measuring unit according to the operation type and the target operation data, where when the operation type indicates an operation for inputting a food quantity, the target display value is the target operation value, and when the operation type indicates an operation for modifying a pre-stored food quantity and the target measuring unit matches a pre-stored measuring unit in category, the target display value is determined according to the target operation value and the pre-stored food quantity.

In some embodiments, whether the target measuring unit matches the pre-stored measuring unit in category is determined by: determining whether both the target measuring unit and the pre-stored measuring unit are weight units, singular measuring units or plural measuring units; and determining that the target measuring unit matches the pre-stored measuring unit in category if both the target measuring unit and the pre-stored measuring unit are weight units, singular measuring units or plural measuring units.

In some embodiments, the operation for modifying a pre-stored food quantity includes an increase operation and a decrease operation. The target display value is determined by: determining a sum of a pre-stored food quantity value and the target operation value as the target display value when the operation type indicates an increase operation; and determining a difference between a pre-stored food quantity value and the target operation value as the target display value when the operation type indicates an decrease operation.

In some embodiments, when both the target measuring unit and the pre-stored measuring unit are weight units, determining the target display value further includes: determining whether the target measuring unit is consistent with the pre-stored measuring unit; converting the pre-stored food quantity to an intermediate value in the target measuring unit when the target measuring unit is inconsistent with the pre-stored measuring unit; and determining the target display value according to the target operation value and the intermediate value.

In some embodiments, predetermined prompt information is displayed to prompt the user that the food shelf life cannot be operated according to the input voice command if the target measuring unit does not match the pre-stored measuring unit in category and the operation type indicates an operation for modifying a pre-stored food quantity.

S114, displaying the target display value and the target measuring unit as an input content corresponding to the food quantity on the food editing interface.

In some embodiments, the method according to the embodiments of the present application further includes: updating the pre-stored food quantity value and the pre-stored measuring unit with the target display value and the target measuring unit.

It can be seen from the above embodiments of the voice control method, when the food editing interface is displayed, the user may input or modify the food quantity by inputting a voice command. When the food quantity is input through voice control, even if a quantity measuring unit presented on the food editing interface is inconsistent with a quantity measuring unit in the voice command from the user, an input operation may be realized. The user only needs to say a preset measuring unit as the quantity measuring unit, instead of inputting the voice command according to the quantity measuring unit currently presented on the display. When the pre-stored food quantity is modified through voice control, a modification operation may be realized only by uttering the quantity measuring unit in the voice command of the user which matches the pre-stored measuring unit in category, instead of uttering the quantity measuring unit in the voice command of the user which is the exact expression of the pre-stored measuring unit. The refrigerator may display the quantity measuring unit said by the user when the quantity measuring unit said by the user is inconsistent with a current default measuring unit presented on the display, such that user experience is improved.

What is claimed is:

1. A refrigerator, comprising:
a refrigerator body, including a storage compartment;
a door disposed at an opening of the storage compartment;
a display arranged on the door;
a voice collector, configured for receiving a voice command input from a user, wherein the voice command is associated with operations about food in the storage compartment; and
a processor, in connection with the display and the voice collector, wherein the processor is configured for causing the refrigerator to perform:
presenting a first food editing interface on the display, wherein the first food editing interface comprises an input item available for receiving an input from the user, and the input item is for indicating a food quantity and a food shelf life, and the input item comprises a value and a measuring unit;
during presentation of the first food editing interface, receiving a first voice command input from the user via the voice collector;
obtaining a first operation type and first operation data for operating a food quantity by parsing the first voice command, wherein the first operation data comprises a first operation value and a first measuring unit;
in response to the first operation data being inconsistent with a pre-stored value and/or a pre-stored measuring unit, determining whether the first measuring unit is a preset measuring unit and whether the first operation value falls within a preset operation range for the first measuring unit;
in response to the first measuring unit being the preset measuring unit and the first operation value falling within the preset operation range, determining whether the first measuring unit matches the pre-stored measuring unit in category;
in response to the first measuring unit matching the pre-stored measuring unit in category and the first operation type being an operation for inputting a food quantity, determining the first operation value as a target display value;
in response to the first measuring unit matching the pre-stored measuring unit in category and the first operation type being an operation for modifying a pre-stored food quantity, determining a target display value according to the first operation value and the pre-stored food quantity; and
according to the determined target display value and the first measuring unit, updating the first food editing interface to obtain a second food editing interface.

2. The refrigerator according to claim 1, wherein the processor is further configured for causing the refrigerator to perform:
determining whether both the first measuring unit and the pre-stored measuring unit are one of a weight unit, a singular measuring unit or a plural measuring unit; and
in response to both the first measuring unit and the pre-stored measuring unit being one of the weight unit, the singular measuring unit or the plural measuring unit, determining that the first measuring unit matches the pre-stored measuring unit in category.

3. The refrigerator according to claim 1, wherein the processor is further configured for causing the refrigerator to perform:
in response to the first operation type being an increase operation, determining a sum of a pre-stored food quantity value in the refrigerator and the first operation value as the target display value;
in response to the first operation type being an decrease operation, determining a difference between a pre-stored food quantity value in the refrigerator and the first operation value as the target display value.

4. The refrigerator according to claim 2, wherein the processor is further configured for causing the refrigerator to perform:

determining whether the first measuring unit is same as the pre-stored measuring unit;

in response to the first measuring unit being not same as the pre-stored measuring unit, converting the pre-stored food quantity to an intermediate value in the first measuring unit; and determining the target display value according to the first operation value and the intermediate value.

5. The refrigerator according to claim 1, wherein the processor is further configured for causing the refrigerator to perform:

in response to the first operation type being the operation for modifying the pre-stored food quantity and the first measuring unit not matching the pre-stored measuring unit in category, displaying predetermined prompt information to prompt the user that the food shelf life is not available for operation according to the first voice command input from the user.

6. The refrigerator according to claim 1, wherein the processor is further configured for causing the refrigerator to perform:

during presentation of the second food editing interface, receiving a second voice command input from the user;

obtaining a second operation type and second operation data for operating the food shelf life by parsing the second voice command, wherein the second operation data comprises a second operation value and a second time unit;

determining third operation data corresponding to the second operation data, wherein the third operation data comprises a third operation value and a third time unit, and the third time unit is a preset time unit configured in the refrigerator; and according to the second operation type and the third operation data, updating an input content of the food shelf life on the second food editing interface to obtain a third food editing interface.

7. The refrigerator according to claim 6, wherein the processor is further configured for causing the refrigerator to perform:

in response to the second time unit being same as the preset time unit and the second operation value being an integer, determining the second time unit as the third time unit and the second operation value as the third operation value, wherein the preset time unit includes month and day;

in response to the second time unit being not same as the preset time unit or the second operation value being not an integer, converting the second operation value to the third operation value in the preset time unit, wherein the third operation value is an integer, and the preset time unit includes month and day.

8. The refrigerator according to claim 6, wherein the processor is further configured for causing the refrigerator to perform:

in response to the second time unit being a year or a month, converting the second operation value into the third operation value in month or day;

in response to the second time unit being a week, converting the second operation value to the third operation value in day.

9. The refrigerator according to claim 6, wherein the processor is further configured for causing the refrigerator to perform:

according to the second operation type and the third operation data, determining display data for presenting on the third food editing interface, wherein the display data comprises a display value and the third time unit; and presenting the display data as input content for the food shelf life on the third food editing interface.

10. The refrigerator according to claim 9, wherein the second operation type comprise an extension operation for the food shelf life, a shortening operation for food shelf life and a setting operation for the food shelf life.

11. The refrigerator according to claim 10, wherein the processor is further configured for causing the refrigerator to perform:

in response to the second operation type being the setting operation, determining the third operation value as the display value;

in response to the second operation type being the extension operation, determining the display value according to a sum of a pre-stored shelf life value and the third operation value; and in response to the second operation type being the shortening operation, determining the display value according to a difference between a pre-stored shelf life value and the third operation value.

12. The refrigerator according to claim 11, wherein the processor is further configured for causing the refrigerator to perform:

converting the pre-stored shelf life value and the third operation value to a first intermediate value and a second intermediate value in an intermediate time unit respectively;

obtaining an intermediate sum in the intermediate time unit by adding the first intermediate value and the second intermediate value; and converting the intermediate sum to the display value in the third time unit.

13. The refrigerator according to claim 11, wherein the processor is further configured for causing the refrigerator to perform:

converting the pre-stored shelf life value and the third operation value to a first intermediate value and a second intermediate value in an intermediate time unit respectively;

obtaining an intermediate difference in the intermediate time unit by subtracting the first intermediate value from the second intermediate value; and converting the intermediate difference to the display value in the third time unit.

14. The refrigerator according to claim 12, wherein the processor is further configured for causing the refrigerator to perform:

converting the display value to a shelf life value in a storage time unit that is preset in the refrigerator; and storing the shelf life value in food information.

15. A method for processing food information in a refrigerator, comprising:

presenting a first food editing interface on a display of the refrigerator, wherein the first food editing interface comprises an input item available for receiving an input from the user, and the input item is for indicating a food quantity and a food shelf life, and the input item comprises a value and a measuring unit;

during presentation of the first food editing interface, receiving a first voice command input from the user via a voice collector of the refrigerator;

obtaining a first operation type and first operation data for operating a food quantity by parsing the first voice command, wherein the first operation data comprises a first operation value and a first measuring unit;

in response to the first operation data being inconsistent with a pre-stored value and/or a pre-stored measuring unit, determining whether the first measuring unit is a preset measuring unit and whether the first operation value falls within a preset operation range for the first measuring unit;

in response to the first measuring unit being the preset measuring unit and the first operation value falling within the preset operation range, determining whether the first measuring unit matches the pre-stored measuring unit in category;

in response to the first measuring unit matching the pre-stored measuring unit in category and the first operation type being an operation for inputting a food quantity, determining the first operation value as a target display value;

in response to the first measuring unit matching the pre-stored measuring unit in category and the first operation type being an operation for modifying a pre-stored food quantity, determining a target display value according to the first operation value and the pre-stored food quantity; and according to the determined target display value and the first measuring unit, updating the first food editing interface to obtain a second food editing interface.

16. The method according to claim 15, further comprising:
determining whether both the first measuring unit and the pre-stored measuring unit are one of weight unit, singular measuring unit or plural measuring unit; and
in response to both the first measuring unit and the pre-stored measuring unit being one of the weight unit, the singular measuring unit or the plural measuring unit, determining that the first measuring unit matches the pre-stored measuring unit in category.

17. The method according to claim 15, further comprising:
in response to the first operation type being an increase operation, determining a sum of a pre-stored food quantity value in the refrigerator and the first operation value as the target display value;

in response to the first operation type being an decrease operation, determining a difference between a pre-stored food quantity value in the refrigerator and the first operation value as the target display value.

18. The method according to claim 16, further comprising:
determining whether the first measuring unit is same as the pre-stored measuring unit;
in response to the first measuring unit being not same as the pre-stored measuring unit, converting the pre-stored food quantity to an intermediate value in the first measuring unit; and
determining the target display value according to the first operation value and the intermediate value.

19. The method according to claim 15, further comprising:
in response to the first operation type being the operation for modifying the pre-stored food quantity and the first measuring unit not matching the pre-stored measuring unit in category, displaying predetermined prompt information to prompt the user that the food shelf life is not available for operation according to the first voice command input from the user.

20. The method according to claim 15, further comprising:
during presentation of the second food editing interface, receiving a second voice command input from the user;
obtaining a second operation type and second operation data for operating the food shelf life by parsing the second voice command, wherein the second operation data comprises a second operation value and a second time unit;
determining third operation data corresponding to the second operation data, wherein the third operation data comprises a third operation value and a third time unit, and the third time unit is a preset time unit configured in the refrigerator; and
according to the second operation type and the third operation data, updating an input content of the food shelf life on the second food editing interface to obtain a third food editing interface.

* * * * *